US012583127B2

(12) United States Patent　　　　　(10) Patent No.:　　US 12,583,127 B2
Creusot et al.　　　　　　　　　　　(45) Date of Patent:　　Mar. 24, 2026

(54) INTERFACE SYSTEM AND/OR METHOD FOR REFILLING ASSEMBLY SYSTEMS

(71) Applicant: Chef Robotics, Inc., San Francisco, CA (US)

(72) Inventors: Clement Creusot, San Francisco, CA (US); Rajeev Sarvaria, San Francisco, CA (US); Luis Rayas, San Francisco, CA (US); Rajat Bhageria, San Francisco, CA (US); Xiaoyi Chen, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 440 days.

(21) Appl. No.: 18/124,451

(22) Filed: Mar. 21, 2023

(65) Prior Publication Data

US 2023/0294295 A1　　　Sep. 21, 2023

Related U.S. Application Data

(60) Provisional application No. 63/321,999, filed on Mar. 21, 2022.

(51) Int. Cl.
　　*B25J 9/16*　　　　(2006.01)
　　*B25J 9/00*　　　　(2006.01)
　　　　　(Continued)

(52) U.S. Cl.
　　CPC ......... *B25J 11/0045* (2013.01); *B25J 9/0093* (2013.01); *B25J 9/1694* (2013.01); *B25J 13/085* (2013.01)

(58) Field of Classification Search
　　CPC ...... B25J 9/0093; B25J 9/1694; B25J 9/1697; B25J 11/0045; B25J 13/085; B25J 19/023; G05B 2219/31313; G05B 2219/37357
　　See application file for complete search history.

(56) References Cited

U.S. PATENT DOCUMENTS 3,300,945　A　　1/1967　Grossi et al.
5,218,812　A　　6/1993　Ventura et al.
　　　　　(Continued)

FOREIGN PATENT DOCUMENTS

EP　　　3810375　B1　　8/2024
JP　　2003128002　A　　5/2003
　　　　　(Continued)

*Primary Examiner* — Dale Moyer
(74) *Attorney, Agent, or Firm* — Jeffrey Schox; Evan Myers

(57) ABSTRACT

The method can include: receiving sensor measurements; maintaining an ingredient model for a foodstuff bin; determining a set of ingredient parameters; providing feedback based on the ingredient parameters; and/or any other suitable elements. The method can optionally include determining a refill event; and responding to a refill event. However, the method can additionally or alternatively include any other suitable elements. The method can function to facilitate automatic refill notifications at a human-machine interface (HMI) and/or can function to facilitate automatic control adjustments based on ingredient refill events. Additionally or alternatively, the method can function to facilitate provision of user feedback for key ingredient parameters, such as a remaining ingredient amount in a particular foodstuff bin, pick weight/volume statistics, via the HMI.

22 Claims, 13 Drawing Sheets

(51) Int. Cl.
    *B25J 11/00*        (2006.01)
    *B25J 13/08*        (2006.01)

(56)              References Cited

U.S. PATENT DOCUMENTS

| | | | |
|---|---|---|---|
| 2013/0118131 A1 | 5/2013 | Weder et al. | |
| 2018/0050451 A1* | 2/2018 | Takanishi | B25J 9/1697 |
| 2019/0176338 A1* | 6/2019 | Zito | G06Q 50/12 |
| 2019/0261565 A1 | 8/2019 | Robertson et al. | |
| 2020/0139554 A1* | 5/2020 | Sinnet | B25J 19/02 |
| 2020/0269434 A1* | 8/2020 | Anderson | A47J 44/00 |
| 2022/0108250 A1* | 4/2022 | Pietz | G06Q 10/06316 |
| 2022/0346598 A1* | 11/2022 | Sinnet | A47J 37/1228 |
| 2023/0278229 A1 | 9/2023 | Brown et al. | |
| 2023/0398689 A1 | 12/2023 | Brown et al. | |
| 2024/0029020 A1* | 1/2024 | Stork Genannt Wersborg | G06Q 30/0202 |
| 2024/0320584 A1* | 9/2024 | Manfrey | G05B 19/041 |

FOREIGN PATENT DOCUMENTS

| | | | |
|---|---|---|---|
| WO | 2022118021 A1 | 6/2022 | |
| WO | 2023000074 A1 | 1/2023 | |

* cited by examiner

100 frame

HMI
110 robot arm imaging sensors feedback sensor

HMI
110 end effector
(e.g., actuated food utensil)

support structure support structure foodstuff bin foodstuff bin force sensor force sensor conveyance
system food container food container robotic assembly
system 120

100 robotic assembly
system 120 imaging
sensor(s)

robot arm frame

HMI 110 pick regions refill regions scale

HMI 110 base structure

100 foodstuff bins
(pick config.)

100 foodstuff bin
(pick config.)

foodstuff bin
(refill config.)

100 foodstuff bins
(refill config.)

*All Dimension in millimeters

S100

INTERFACE SYSTEM AND/OR METHOD FOR REFILLING ASSEMBLY SYSTEMS

CROSS REFERENCE TO RELATED APPLICATIONS

This application claims the benefit of U.S. Provisional Application No. 63/321,999, filed 21 Mar. 2022, which is incorporated herein in its entirety by this reference.

TECHNICAL FIELD

This invention relates generally to the robotic assembly field, and more specifically to a new and useful interface system and/or method in the robotic assembly field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
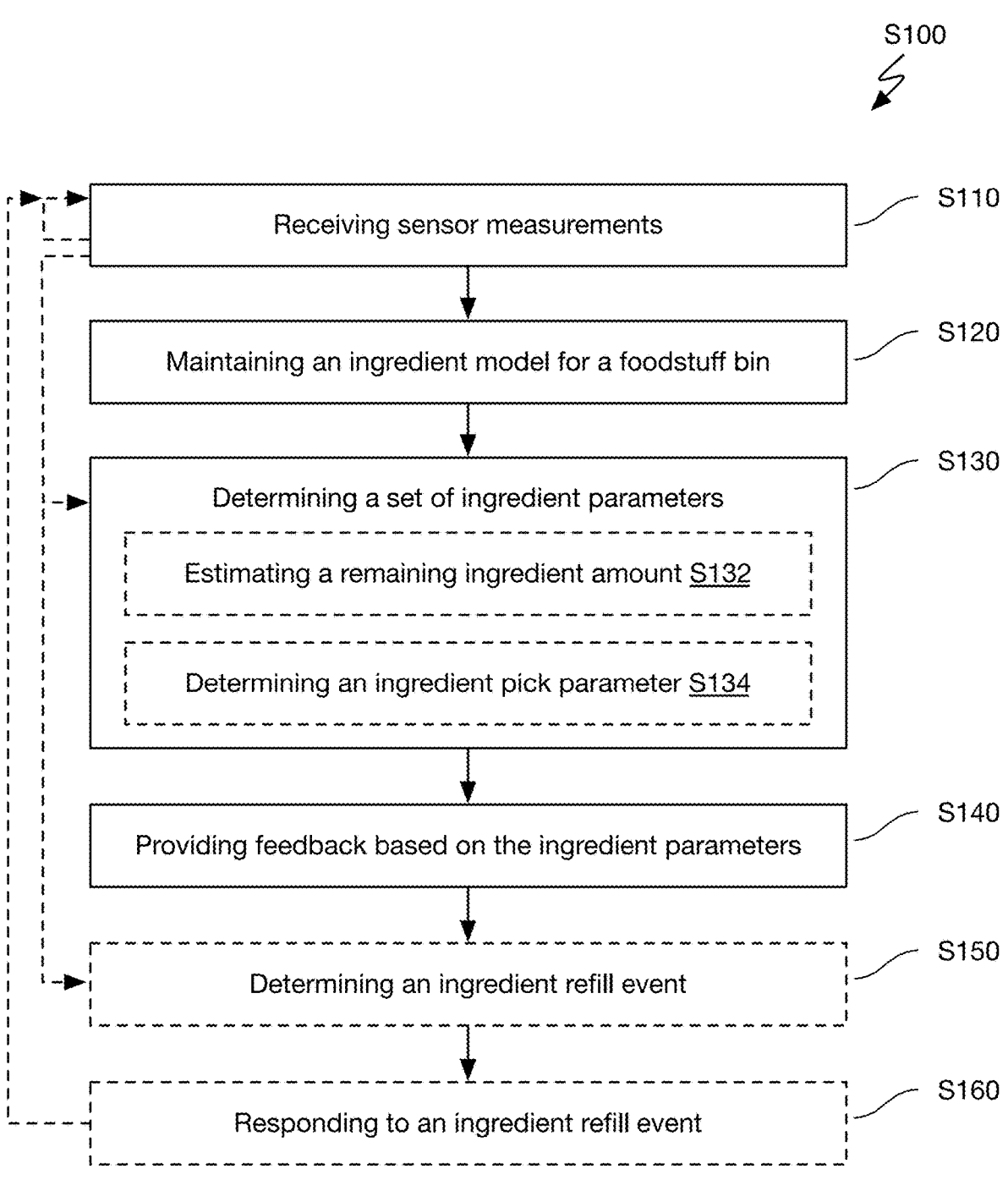
FIG. 1 is a flowchart diagrammatic representation of a variant of the method.

The method S100, an example of which is shown in FIG. 1, can include: receiving sensor measurements S110; maintaining an ingredient model for a foodstuff bin S120; determining a set of ingredient parameters S130; providing feedback based on the ingredient parameters S140; and/or any other suitable elements. The method can optionally include determining a refill event S150; and responding to a refill event S160. However, the method S100 can additionally or alternatively include any other suitable elements. The method can function to facilitate automatic refill notifications at a human-machine interface (HMI) and/or can function to facilitate automatic control adjustments based on ingredient refill events (e.g., without direct programmatic inputs from a user). Additionally or alternatively, the method can function to facilitate provision of user feedback for key ingredient parameters, such as a remaining ingredient amount in a particular foodstuff bin, pick weight/volume statistics (e.g., average, variance; for a robot, over a time period, for an individual pick, etc.), via a human-machine interface (HMI). However, the method S100 can provide any other suitable function(s).

Figure 3:
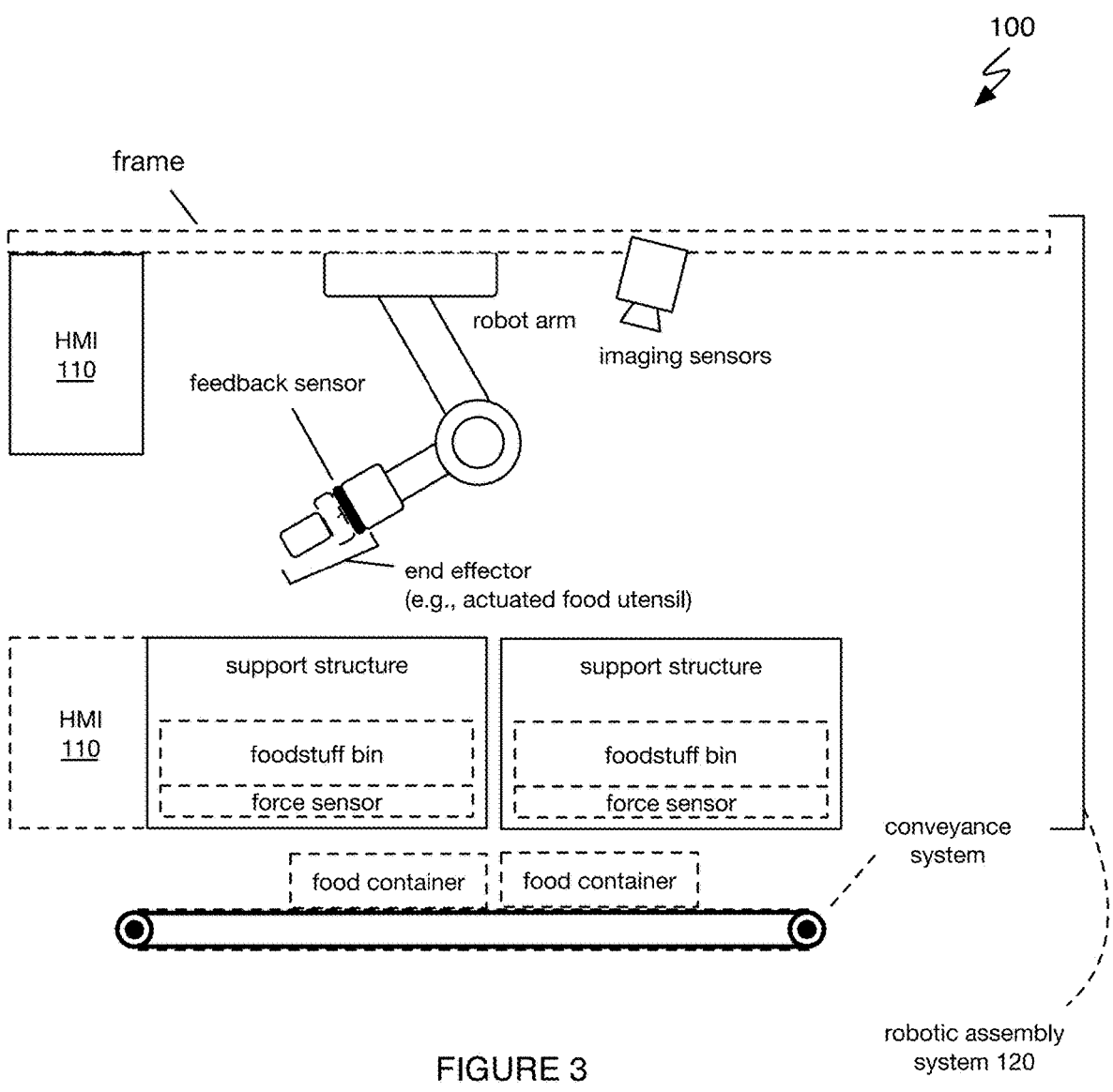
FIG. 3 is a schematic representation of a variant of the system.
Figure 4:
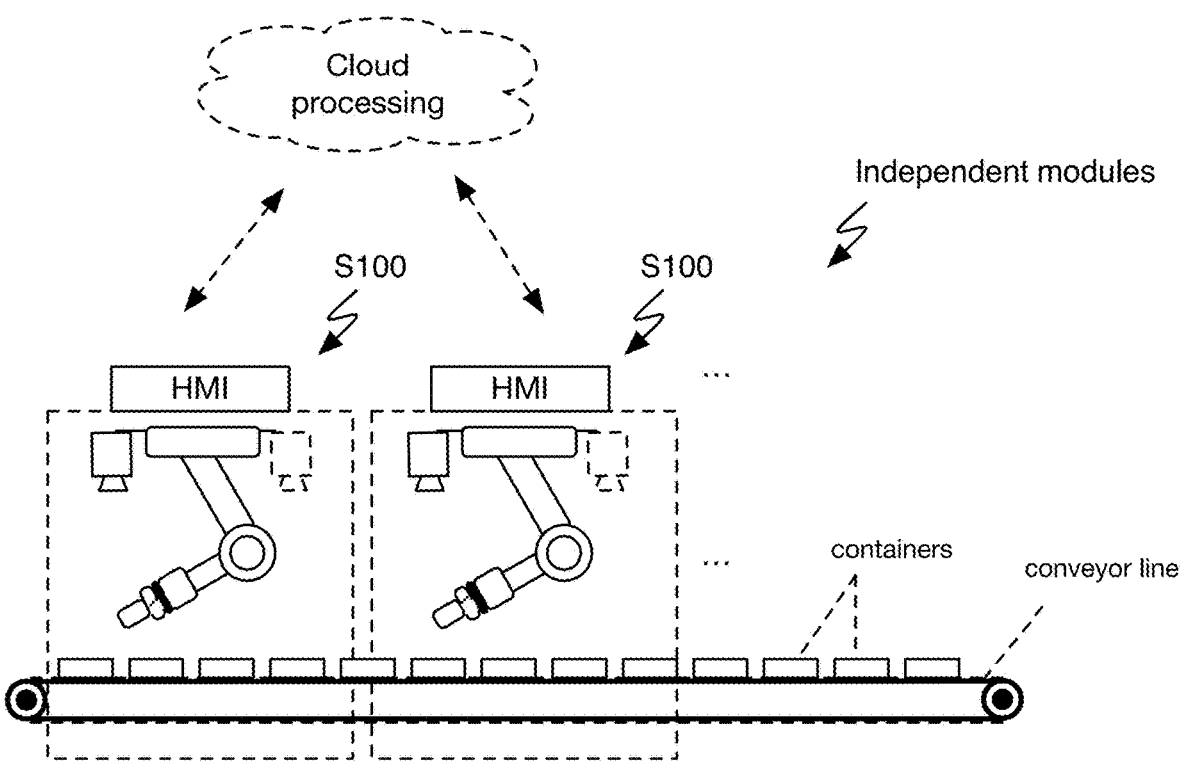
FIG. 4 is a schematic representation of a variant of the system.

The method S100 can be performed by a system 100, an example of which is shown in FIG. 3, can include a human-machine interface 110; an optional robotic assembly system 120; and/or any other suitable set of components. The system functions to facilitate execution of S100, and can additionally or alternatively function to facilitate ingredient picking from a foodstuff bin and/or ingredient placement within food containers (e.g., on a conveyance system, such as an industrial conveyor belt). However, the system 100 can additionally or alternatively include any other suitable set of components. In variants, the system and/or method can be used in conjunction with the refill table, robotic system(s), and/or method(s) as described in U.S. application Ser. No. 18/114,892, filed 27 Feb. 2023, titled "SYSTEM AND/OR METHOD FOR REFILLING ASSEMBLY SYSTEMS," which is incorporated herein in its entirety by this reference. In variants, the system can include or be used in conjunction with the foodstuff assembly system as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

Figure 5:
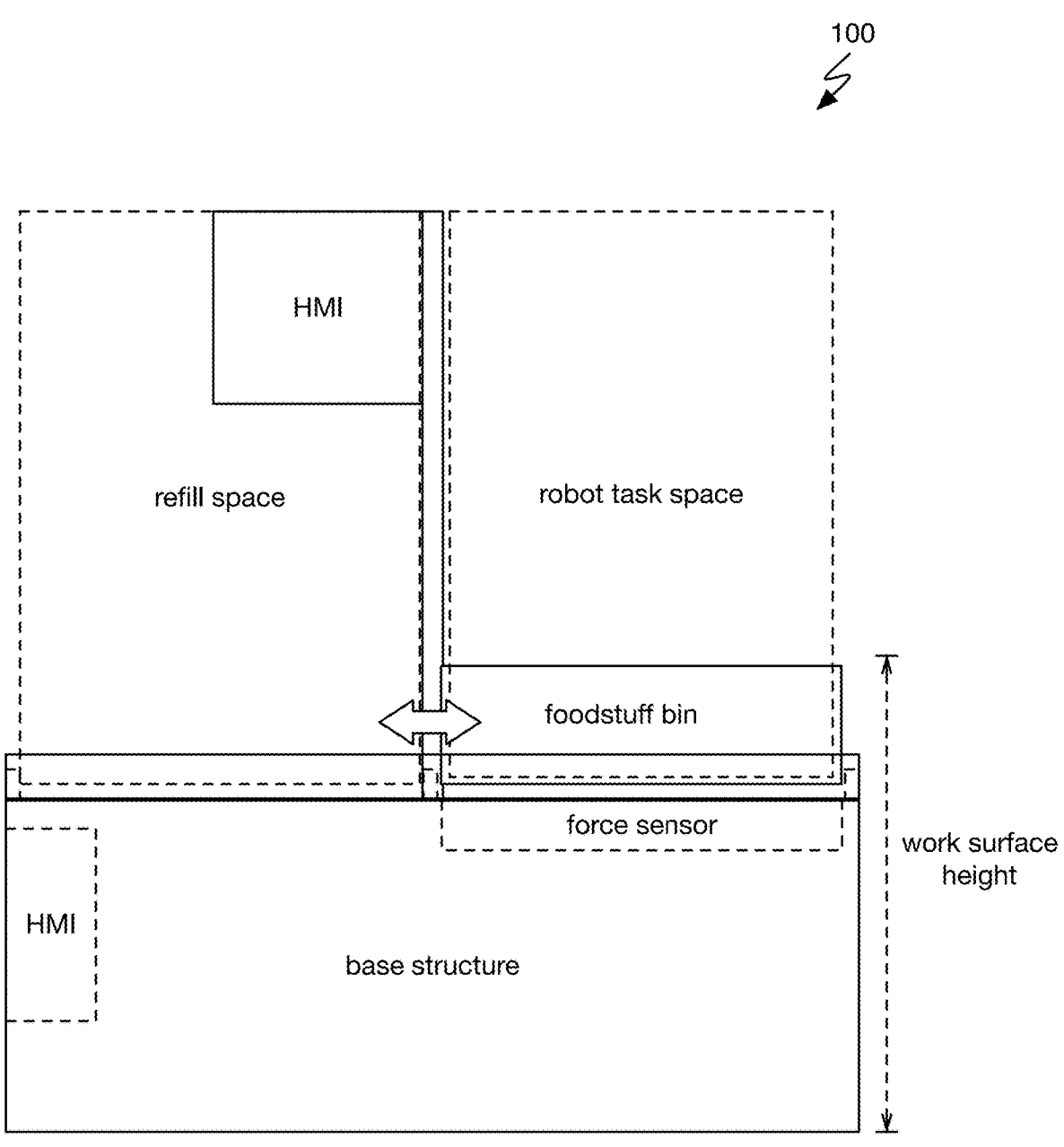
FIG. 5 is a schematic representation of a variant of the system.
Figure 7:
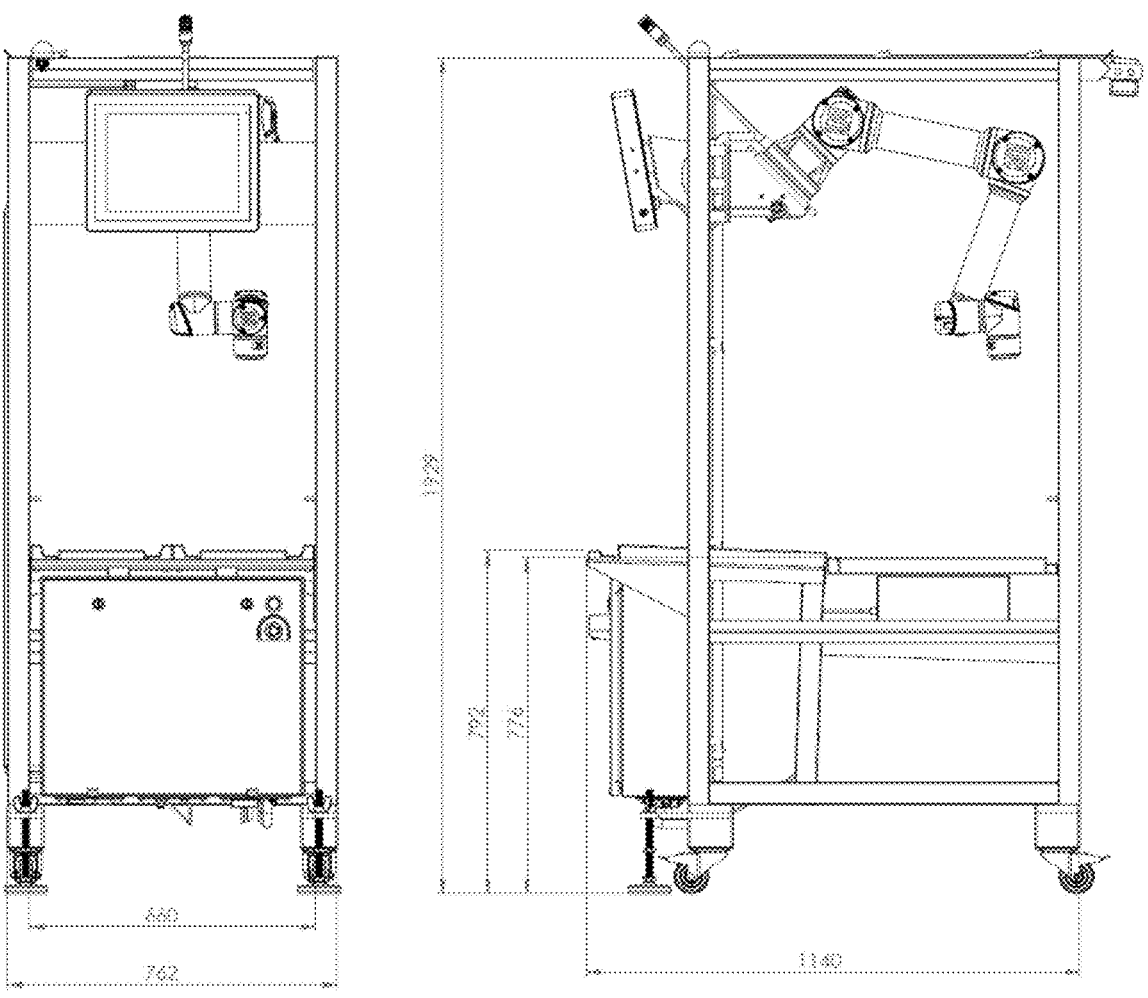
FIG. 7 is a layout drawing of a variant of the system with example dimensions.

In a specific example, the HMI can include a display (e.g., touch screen display, LED, etc.) arranged outside of a workspace of the robotic assembly system and within a refill space (e.g., above a refill region of the robotic assembly system configured to house a foodstuff bin; examples are shown in FIGS. 5 and 7), where a user may freely move/operate without interference from the robot.

The system can optionally include or be used in conjunction with a robotic assembly system 120 (e.g., examples are shown in FIG. 3, FIG. 4, and FIGS. 6A-D), such as a robotic pick and place system, gantry-style assembly system, multi-axis robotic arm, and/or other robotic assembly system. In a first set of variants, the system can optionally include or be used in conjunction with an industrial conveyor line, or can be deployed in a high-throughput assembly application (e.g., airline food catering prep, etc.), such as to facilitate assembly by human workers and/or cooperative assembly by human operators and robots. However, the system can alternatively be deployed in any suitable assembly settings. In a second set of variants, the system can be implemented in a restaurant setting, such as a 'fast casual', 'ghost kitchen' or low-throughput application (e.g., without continuous operation; universities, K-12 schools, prisons, hotels, hospitals, factories, stadiums, entertainment venues, festivals, etc.).

The term "substantially" as utilized herein can mean: exactly, approximately, within a predetermined threshold or tolerance, and/or have any other suitable meaning.

The terms "pick target" and/or "insert target" as used herein can refer to a physical point in space (e.g., within an image scene), a virtual point corresponding to the physical point, a 3D point in space, a 2D image feature in an image, a point (e.g., voxel or set thereof) in a depth image (e.g., 2.5D), and/or any other suitable grasp point. Likewise, a "pick target" and/or an "insert target" can be defined in and/or referenced relative to joint/cartesian coordinate frame (e.g., spatial domain) or a sensor coordinate frame (e.g., image coordinate frame, pixel position; a planar projection of spatial domain, etc.). It is understood that conversion between sensor coordinate frames and spatial coordinate frames is known and understood in the field of endeavor, and thus they maybe considered interchangeable as may be convenient.

The term "task space" as utilized herein preferably refers to a mathematical set of effector and/or food utensil poses (e.g., available in a particular arrangement), but can be otherwise suitably used or referenced. The term "workspace" preferably refers to a physical volume associated with all reachable/available poses (e.g., points) for the system and/or robot arm thereof. For example, the workspace of a robot arm can be defined entirely based on the geometry of joints and/or intrinsic kinematic constraints of the arm (e.g., a manufacturer specification, etc.). Similarly, the workspace of a foodstuff assembly system which includes a robot arm can be further restricted by constraints imposed by other system components (e.g., frame geometry, joint boundaries imposed by control software, collision constraints, etc.). Accordingly, the restricted workspace of the foodstuff assembly system can refer to the physical volume in which the robot operates based on the (effective) task space of the robot in a particular configuration.

1.1 Illustrative Example(s)

In variants, the HMI can communicate ingredient parameters and/or all information necessary to operate a robotic assembly system without receiving any direct programmatic inputs from an operator (e.g., such as an input indicating that the operator is about to refill a foodstuff bin, a calibration input[s], etc.). For example, variants can facilitate ingredient refilling during continuous operation of the robotic assembly system without requiring an operator to directly communicate with the HMI (e.g., via a button input, etc.). Instead, in variants the system and/or method can employ multi-faceted combination of user protections during refill to facilitate refilling during continuous system operation (e.g., in a line setting), such as passive protections (e.g., enabling the user to refill the robot without directly entering the workspace of the robot) and software protections (e.g., which can restrict the operational workspace of the robotic assembly system during a refill event; light-curtain protections, CV-based avoidance, etc.).

In variants, the system and/or method can utilize multi-modal sensing and estimation techniques to improve feedback accuracy and/or resolution of ingredient parameters. For example, the system and/or method can utilize volumetric-based estimation for gross ingredient parameters (e.g., remaining amount estimation, remaining pick estimation, time-to-refill estimation, etc.; based on depth imaging and/or surface estimation) and mass-based estimation for individual pick feedback (e.g., pick amount statistics, etc.). This multi-modal estimation approach can be particularly advantageous when deployed in settings with uncalibrated mass-based sensors (i.e., measuring weight; force sensors), since uncalibrated measurements can yield large static error offsets for gross weights but may have minimal or no effect on marginal/differential weight comparisons (e.g., sensed weight change between picks). Thus, in variants a multi-modal sensing/estimation can facilitate greater precision/accuracy for both bulk parameters and marginal (individual pick) parameters than may be achieved by either sensing/estimation modality (e.g., mass-based; volume-based) individually.

Additionally, variants can facilitate multi-modal provisions of feedback (e.g., visual, auditory, haptic; alphanumeric, iconographic, and/or color-coded feedback; multiple display modalities; etc.) which can non-invasively communicate different levels of information specificity and/or which may be interpretable by users in different proximity to the machine. For instance, the system may only provide audible alarm (e.g., which may be heard from a greater than 50 feet away and/or without line-of-sight to the system) when a stoppage is imminent, such as within a threshold time duration or number of picks. Additionally, a user may observe a color-coded light (e.g., indicating an operation status; stack light) from any direction and/or side of the system, which may facilitate status indication to users on an opposite side of the conveyor line (e.g., indicator light and/or blink pattern associated for system status, such as 'active', 'inactive', 'needs refill', etc.). Additionally, a user may quickly glance at an iconographic representation of fill level (e.g., estimated fill percentage; rough approximation of fill percentage) at a display to efficiently note the fill level (e.g., without the cognitive load devoted to numerical specificity for time or number of picks; where fluency in a particular language or numerical system may not be required; etc.). Additionally, granular feedback (e.g., for auditing purposes) can be provided (e.g., without this information being continuously monitored or surfaced to floor workers).

Figure 9:
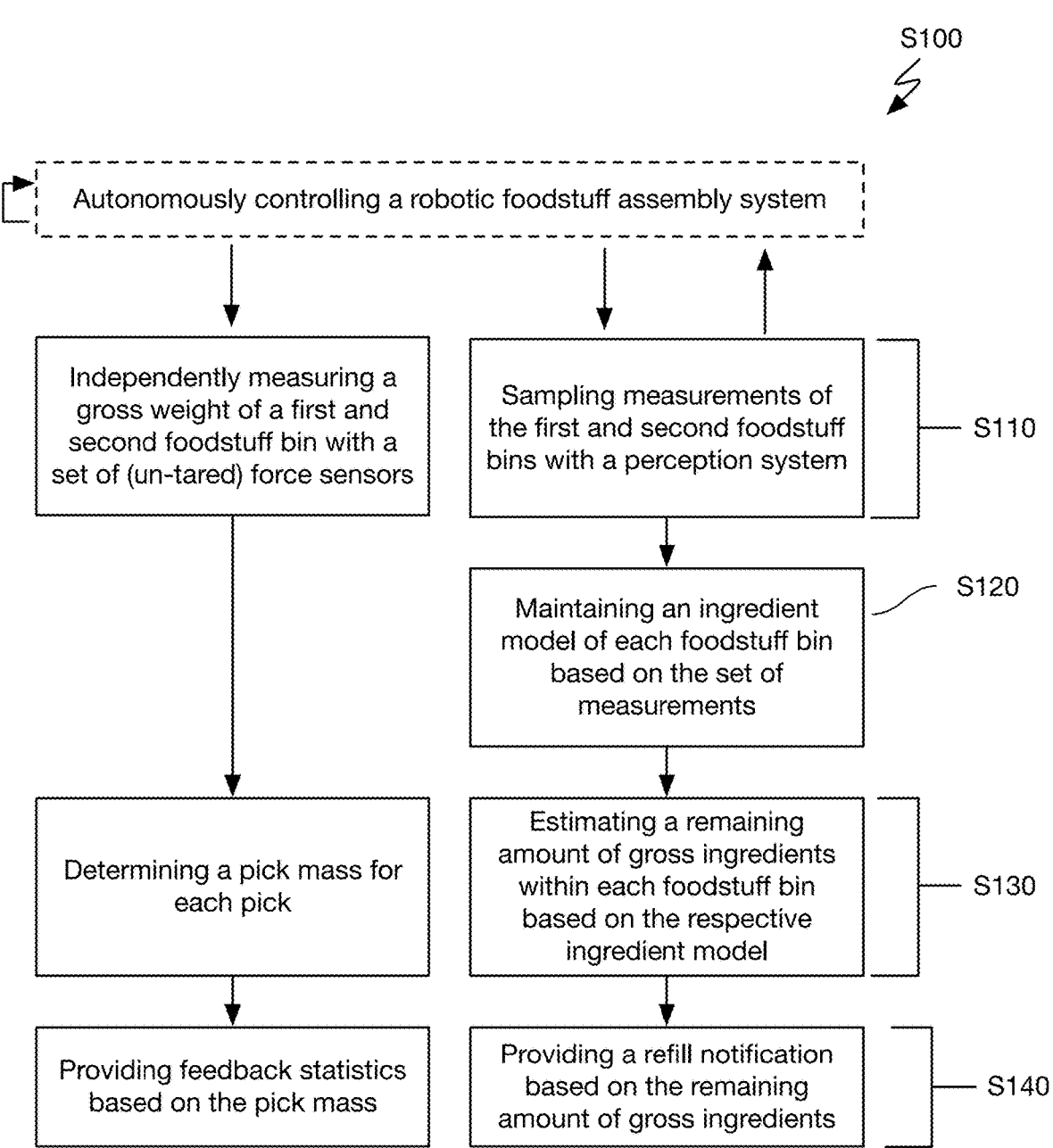
FIG. 9 is a flowchart diagrammatic representation of a variant of the method.

In a first set of variants (e.g., an example is shown in FIG. 9), a method for a robotic foodstuff assembly system, can include: receiving sensor measurements from a sensor suite of the foodstuff assembly system, the sensor suite including: a first and second force sensor configured to independently measure an uncalibrated weight of a first and second foodstuff bin, respectively; and a perception system, configured to sample images of a conveyor region and the first and second foodstuff bins; maintaining a first and second ingredient model of bulk ingredients within the first and second foodstuff bins, respectively, based on sensor measurements received from the perception system; autonomously controlling the robotic foodstuff assembly system to pick bulk ingredients from a target foodstuff bin, selected from the first and second foodstuff bins; and concurrently with controlling the robotic foodstuff assembly system: estimating a gross ingredient parameter for each of the first and second foodstuff bins based on the first and second ingredient models, respectively; and determining a pick parameter based on the uncalibrated weight of the target foodstuff bin; and at a human-machine interface (HMI) of the foodstuff assembly system, providing feedback based on the gross ingredient parameter for each of the first and second foodstuff bins and the pick parameter.

2. Benefits

Variations of the technology can afford several benefits and/or advantages.

First, variations of this technology can enable facile human-machine interactions in an assembly setting, which can reduce the number of humans required for robotic assembly and/or processing operations. In variants, the system can provide facile interactions by utilizing non-disruptive or passive refill notifications (e.g., without requiring immediate user intervention; reducing or eliminating some forms of auditory alerts/alarms to reduce alarm fatigue, etc.), and/or eliminating the need for direct programmatic inputs by a user (e.g., automatically detecting refills and adjusting controls accordingly, automatically generating quality control [QC] and/or quality assurance [QA] data, etc.; in one or more modes of operation) to facilitate operation of the system.

Second, variations of this technology can facilitate consistent bulk object/ingredient assembly (e.g., when compared to a human or a dispensing system) by providing automatic feedback sensing of ingredient weights and/or pick amounts. Such variants can ensure high accuracy (e.g., mass/volume/quantity within a threshold tolerance, such as within 10% of a predetermined amount), auditability (e.g., pick amounts can be automatically validated/verified), and repeatability of assembled food amounts, which may provide cost savings and/or reduce the requirements for downstream verification of ingredient amounts (e.g., for quality control metrics, etc.).

Figure 6A:
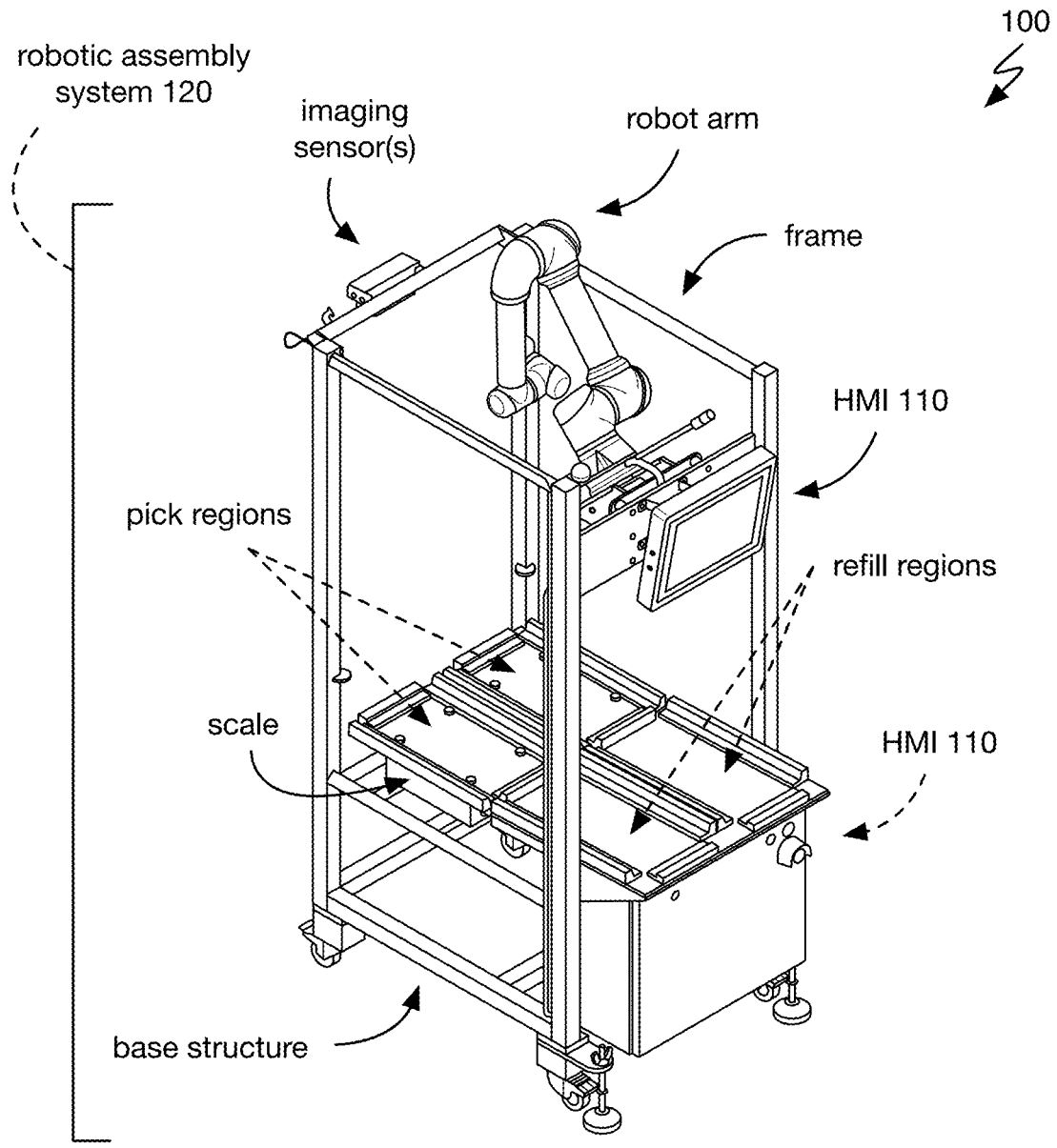
FIG. 6A is an isometric view of a variant of the system.
Figure 6B:
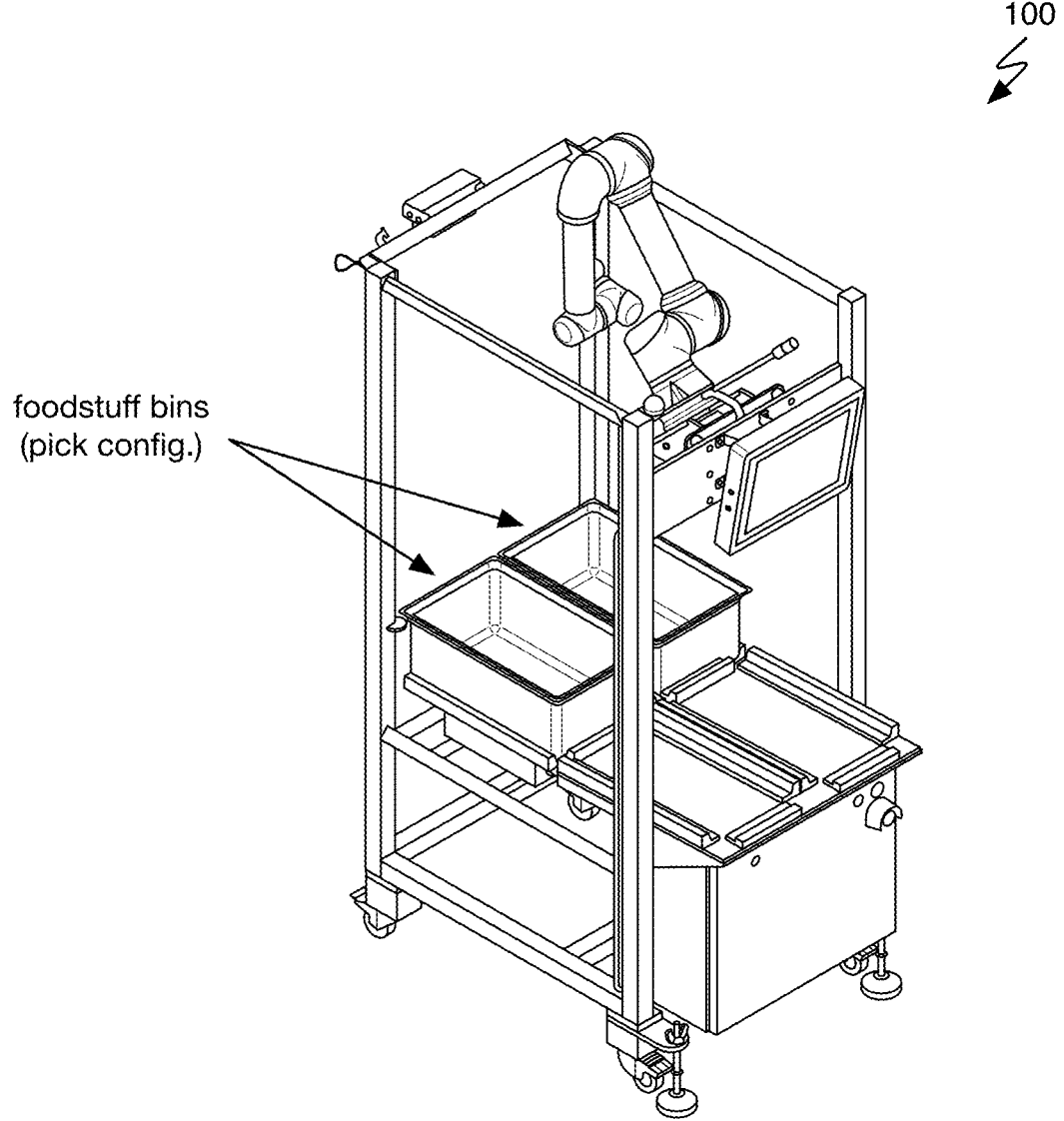
FIG. 6B is an isometric view of a variant of the system illustrating foodstuff bins in a pick configuration.

Third, variations of this technology can facilitate continuous operation of a robotic assembly system while an operator is refilling ingredients by enabling the system to pick from a redundant container (e.g., foodstuff bin) housing the same set of ingredients. For instance, while one foodstuff bin is being refilled, a robotic system may continue to operate while picking from a second foodstuff bin (an example of such a configuration is shown in FIG. 6B; automatically transitioning to the second foodstuff bin in response to a determination that the first is empty). Facilitating refill during operation of a robotic assembly system can minimize downtime of the robotic assembly system, which can be particularly advantageous in high-throughput applications, such as when the system is deployed along a conveyor line (e.g., in place of a human). Variations of this technology can additionally increase the safety of human-machine interactions in a robotic assembly context by reducing or eliminating the need for humans to physically enter (or reach into) the workspace of a robotic assembly system while refilling the system with ingredients and/or by automatically restricting the workspace during a refill event (e.g., to avoid a refill space or foodstuff bin being refilled). Additionally, some variants may facilitate manual restriction of the robot, restricting the system from picking ingredients out of a particular foodstuff bin (e.g., which may provide improved user access to an in-situ bin, such as to allow users to add ingredients to an in-situ bin or otherwise direct the machine, manipulate built-up ingredients stuck to a sidewall, etc.). Additionally, variants can facilitate an operator to request picking out of a particular foodstuff bin (e.g., in a non-restrictive manner; request target selection from a particular foodstuff bin).

However, variations of the technology can additionally or alternately provide any other suitable benefits and/or advantages.

3. System

The system 100 can include: an HMI 110 and a foodstuff assembly system 120. However, the foodstuff assembly system 100 can additionally or alternatively include any other suitable set of components. The foodstuff assembly system functions to enable picking of foodstuff from a set of foodstuff bins 130 and placement into a container (such as a bowl, tray, or other foodstuff receptacle). Additionally or alternatively, the system can function to facilitate transferal of bulk material (e.g., bulk foodstuff) into containers, such as containers moving along a conveyor line. Additionally, the system can function to provide feedback via the HMI and/or can function to facilitate user operation of the system via the HMI.

3.1 Foodstuff Bins

The system 100 can optionally include or can be used with a set of foodstuff bins 130 which functions to retain ingredients for assembly (e.g., to fill an order or a predetermined configuration). Foodstuff bins can include hotel pans, food trays, NSF food safe containers, and/or other suitable containers. There can be a single foodstuff bin (e.g., single hotel pan) or multiple foodstuff bins (e.g., in an array or grid). Foodstuff bins can be identical or vary in size/shape according to the corresponding ingredient housed therein. The foodstuff bins are preferably removable and/or interchangeable (e.g., for cleaning and/or ingredient servicing; based on the arrangement of support structures), but can be otherwise configured.

In some variants, foodstuff bins can be stackable and/or can have a wall(s) with a positive draft angle (e.g., relative to a base of the foodstuff bin), but can alternatively have no draft angle or be otherwise formed. In some variants, the foodstuff bin can have rounded, arcuate, and/or filleted edges (e.g., proximal to a base), but can be otherwise formed. In some variants, foodstuff bins can include a handle, protruding lip, peripheral flange, and/or other graspable feature disposed near an upper end of the foodstuff bin which extending outward relative to the interior cavity of the foodstuff bin (e.g., along a long axis of the foodstuff bin).

The system 100 is preferably configured to simultaneously support at least two foodstuff bins (e.g., in the same/different configurations) which may allow one to foodstuff bin to be refilled while the robot picks from the remaining foodstuff bin, thereby facilitating substantially continuous operation (e.g., without requiring a pause to refill an empty bin) and/or robot picks contemporaneously occurring during refills. As an example, the foodstuff assembly module can be configured to pick (e.g., with a collaborative robot arm) foodstuff ingredients from a first foodstuff bin of the plurality contemporaneously with an operator manually transitioning a second foodstuff bin of the plurality between the pick region and the refill region. However, the system can be configured to operate with a single foodstuff bin, a plurality of foodstuff bins (e.g., exactly two, more than two, etc.), and/or any other suitable number of foodstuff bins.

For example, foodstuff bins can be removably arranged within the robotic assembly system (and/or within a restricted workspace of the robot arm), with each foodstuff bin independently supported by the frame.

In a second example, the foodstuff bins can be positioned within the robotic foodstuff assembly module by a refill table (e.g., integrated into the structure of the frame and/or removably attached to the frame), such as by the system and/or method(s) as described in U.S. application Ser. No. 18/114,892, filed 27 Feb. 2023, titled "SYSTEM AND/OR METHOD FOR REFILLING ASSEMBLY SYSTEMS," which is incorporated herein in its entirety by this reference. In a second However, the system can include any other suitable set of foodstuff bins. Alternatively, the system can altogether exclude foodstuff bins (e.g., in one or more configurations, such as during cleaning) and/or can be otherwise suitably configured.

3.2 Robotic Assembly System

In variants, the system 100 can optionally include, operate in conjunction with, and/or integrate with a robotic assembly system which can include: a robot arm, a frame, a sensor suite, and a computing system. However, the foodstuff assembly system 100 can additionally or alternatively include any other suitable set of components. The system functions to enable picking of foodstuff from a set of foodstuff bins and placement into a container (such as a bowl, tray, or other foodstuff receptacle). Additionally or alternatively, the system can function to facilitate transferal of bulk material (e.g., bulk foodstuff) into containers, such as containers moving along a conveyor line.

The robot arm functions to pick foodstuff within the foodstuff bin(s) 130. The robot arm can additionally or alternatively function to place food within food containers (e.g., bowls, microwave trays, etc.). The robot arm is preferably a collaborative robot arm, but can additionally or alternatively be an industrial robot arm and/or any other suitable robot arm. Alternatively, variants can interchangeably utilize any other suitable robotic actuation system(s) such as a gantry system (e.g., belt actuated, ball and screw, linear tubular motor, etc.), delta robot (or delta robot arm), and/or any other suitable robot, robot arm, or robotic system. The robot arm can include any suitable number of joints which enable articulation of the utensil (or another end effector) in a single degree of freedom (DOF). The arm preferably includes 6 joints (e.g., a 6-axis robot arm), but can additionally or alternatively include three joints, seven joints, more than seven joints, and/or any other suitable number of joints. In some variants, the robot arm may be dimensionally oversized and/or over-articulated relative to the effective workspace, which may facilitate higher speed actuation, more favorable kinematics, and/or greater control versatility in different contexts.

The robot arm is preferably mounted to the frame above a top plane of the foodstuff bin(s), which can enable the arm to be return to a pose which is offset from the food containers and/or foodstuff bin (i.e., allowing a user to access foodstuff and/or foodstuff bins with minimal restriction). More preferably, a base joint of robot arm is mounted to an upper portion of the frame and angled towards the foodstuff bin (e.g., directed vertically downward; joint axis defines an angle of 30 degrees, 45 degrees, 60 degrees, 90 degrees, and/or any subrange bounded therein relative to a gravity vector; relative to horizontal; etc.). In a specific example, the robot arm can be mounted with a surface normal vector of the base of the robot arm defining a zenith angle between zero degrees (e.g., surface normal directed vertically upward; robot arm directed vertically downward) and 150 degrees (e.g., robot arm inclined by 30 degrees). In a second specific example, the robot arm can be mounted on an incline, angled towards the food container and/or conveyor region (e.g., such at an angle of about 45 degrees). However, the robot arm can be top-mounted, wall-mounted/side-mounted and/or bottom-mounted/floor-mounted (e.g., with a base joint directed upwards). However, the robot arm can be otherwise suitably mounted.

In variants, the robot arm can be mounted to the frame: on the same side as a conveyor and/or adjacent to a conveyor region (e.g., adjacent a portion of the robotic system proximal to the conveyor); opposite a conveyor and/or a conveyor region; symmetrically or asymmetrically about a midsagittal plane; and/or with any other suitably arrangement. In a specific example, the robot arm can be mounted opposite a human machine interface (e.g., on a rear portion of the robotic assembly system, distal the conveyor; on opposite sides of a backing) and refill region. In a second example, the robot arm can be adjacent to the HMI and/or mounted to a common backing plate or support structure.

The robot arm, including elements and/or joints thereof, can be surrounded by the frame (e.g., within a bounding box of the frame; within a guarded perimeter of the frame; bounded in a horizontal plane by a set of guards or physical user protections; within an open-sided frame; etc.) in one or more configurations (e.g., power-off state). Additionally or alternatively, the robot arm and/or one or more joints/elements thereof can be configured to articulate above the frame and/or extend through the frame (e.g., through a top end of the frame, through an aperture/orifice at the top of the frame, etc.). In a specific example, the robot arm comprises a plurality of joints, wherein at least one joint of the robot arm extends above a top plane of the frame in one or more configurations.

In variants, the system 100 can include or be used in conjunction with the foodstuff assembly system as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

However, the system can include any other suitable robot arm and/or robotic actuation system(s).

The frame functions to structurally support the robot arm. The frame can additionally function to position the foodstuff bin relative to the robot arm. The frame can additionally or alternatively function as a food assembly workstation for a human (e.g., kitchen and/or line worker; where the base structure is integrated into the frame). The frame can define an open, partially enclosed, or fully enclosed workspace of the system. The frame can be self-supporting (e.g., free-standing), rigidly mounted (e.g., fixed to the floor), suspended (e.g., to a superstructure, such as a roof), wall mounted, and/or otherwise configured. The frame can be unitary or modular. In variants, multiple modules of the foodstuff assembly system can be rigidly connected and/or aligned to one another with various mounting hardware, alignment features, and/or spanning members. Alternatively, the system can be mechanically isolated and/or physically separate from other modules (e.g., in an industrial line setting), and/or can be otherwise suitably configured.

The frame can be static, movable (e.g., wheeled, having a set of casters, etc.), adjustable (e.g., height adjustable, attitude adjustable, etc.), leveled (e.g., via leveling feet, such as rubberized mounting feet), and/or can be otherwise configured. In a first set of variants, the frame can be attitude adjustable, which may facilitate stability on non-horizontal ground surfaces (e.g., to facilitate water drainage, etc.) and/or accommodation of various conveyor configurations in a line settings. For example, a height and/or attitude of the frame structure and/or one or more elements thereof may be (manually) adjustable/variable to conform to floors and/or conveyors which are curved and/or angled (e.g., in pitch and/or yaw).

However, the system can include any other suitable frame.

The sensor suite can include imaging sensors, feedback sensors, and/or any other suitable sensors. The sensor suite can include imaging sensors which preferably function to capture measurements (e.g., images) of the foodstuff bin and/or food containers (e.g., the foodstuff scene), but can provide any other functionality. The imaging sensors (a.k.a., perception sensors) can include one or more: foodstuff bin cameras (e.g., oriented toward the foodstuff bin), food container cameras (e.g., oriented toward food containers and/or container management system), stereo camera pairs, CCD cameras, CMOS cameras, time-of-flight sensors (e.g., Lidar scanner, etc.), a range imaging sensors (e.g., stereo triangulation, sheet of light triangulation, structured light scanner, time-of-flight, interferometry, etc.), and/or any other suitable sensors. The sensors can be arranged into sensor sets and/or not arranged in sets. The imaging systems can determine one or more RGB images, depth images (e.g., pixel aligned with the RGB, wherein the RGB image and the depth image can be captured by the same or different sensor sets). Imaging sensors are preferably calibrated within a common coordinate frame (i.e., sensor coordinate frame) in a fixed/predetermined arrangement relative to a joint coordinate frame of the robot arm, but can be otherwise suitably configured. For example, sensors can be 'registered' for a particular configuration of the machine and/or relative to a conveyor region (e.g., defining registration parameters, such as relative pose, etc.) as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

The sensor suite can additionally include various feedback sensors which can collect measurements used to generate feedback in accordance with the method S100 (e.g., pick parameters, statistics, etc.). Feedback sensors can include one or more of a: force-torque sensor, load cell, utensil state sensor (e.g., to determine the state of the utensil, such as: engaged, disengaged, open, close; an orientation of utensil actuators; etc.), pressure sensor, strain gage, load cell, inertial sensor, positional sensors, displacement sensors, encoders (e.g., absolute, incremental), resolver, Hall-effect sensor, electromagnetic induction sensor, proximity sensor, contact sensor, and/or any other suitable sensors. However, the sensors can be otherwise configured.

Sensors of the sensor suite can be integrated into the robot arm, frame (e.g., below the foodstuff bins; within the support structure for an individual foodstuff bin; etc.), and/or any other component of the system, otherwise suitably arranged.

In variants (e.g., 'line variant'), feedback sensors can include a weight sensor (e.g., scale) arranged at a base of the foodstuff bin and configured to measure a weight of foodstuff within the foodstuff bin. For example, the sensor suite can include a weight sensor integrated into the frame (e.g., a pick region of a refill table).

In such variants, a weight of picked foodstuff and a corresponding mass/volume can be inferred from a change in weight of the foodstuff container (and/or foodstuff therein) for an individual pick. For example, an average pick weight can be determined by evaluating the change in container weight across multiple picks, and/or estimated remaining foodstuff amount (e.g., mass, volume, count, etc.) can be determined based on the measured weight at any time.

In a second variant (e.g., 'fast-casual variant'), feedback sensors can include a force-torque sensor and/or load cell configured to measure a weight of food which is supported by and/or contained within a food utensil.

However, the system can include any other suitable sensors and/or feedback mechanisms.

The robotic assembly system can include a computing system which functions to control the robot arm and/or facilitate execution of one or more method elements. The computing system can be local to the module/system (e.g., housed within an electrical enclosure, such as with water and/or particulate ingress protections, etc.), remote, and/or otherwise located. The controller can be wirelessly connected, electrically connected, and/or otherwise connected to one or more components of the system (e.g., HMI, sensors, robot arm, etc.).

As an example, the computing system can be configured to facilitate execution of the method(s) as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

In variants, HMI processing and/or compute can be integrated into the computing system of the robotic assembly system (e.g., centralized at a single processor or processing system) or may be separate (e.g., at a dedicated processor of the HMI, etc.). For example, the HMI can be fully decoupled from a computing system of the robotic foodstuff assembly system.

However, the system can include any other suitable computing system.

3.3 Human Machine Interface (HMI)

The human machine interface (HMI) can function to provide feedback to users to facilitate operation of the system and/or timely ingredient refills. Additionally, human machine interface (HMI) can function to receive human inputs which can be used by the computing system to determine foodstuff assembly instructions and/or control instructions for the foodstuff assembly system (e.g., configuring the machine). The HMI can be local (e.g., at the foodstuff assembly system; mounted to the frame; etc.), remote (e.g., wired and/or wirelessly connected to the foodstuff assembly system; decoupled from the frame), and/or otherwise implemented. The HMI can be centralized (e.g., all inputs received at a single endpoint, such as a touchscreen display) or distributed (e.g., multiple order systems, safety switches, etc.).

The system preferably includes at least one HMI per modular foodstuff assembly system (e.g., one HMI mounted each independent module frame), which may facilitate receipt of different/unique foodstuff assembly instructions, independent module servicing, and/or provision of separate user feedback (e.g., validation parameters, etc.) at distinct modules.

In a specific example, the HMI is preferably mounted to the frame of the foodstuff assembly module and arranged distal to a conveyor (or conveyor region) of the system. For example, the HMI can be mounted opposite the base of a robotic arm (e.g., opposing the robotic arm across a thickness of a frame member; where the robotic arm is side-mounted at a rear end of the foodstuff assembly system, with the rear end opposite to the conveyor, etc.). However, the HMI can be remote from the system or frame (e.g., in a separate instrument panel, one a phone, be accessible via a cloud service, etc.); be mounted: adjacent the robotic arm (e.g., on the same wall, on an adjacent wall, etc.), on top of the system, below the robot workspace, and/or at any other position on the system; and/or be otherwise arranged relative to the system.

The HMI can include feedback systems which can include one or more: light array (e.g., LED stack; colored lights), display (e.g., touchscreen display, digital display, CRT, etc.), audio device (e.g., loudspeaker, audio speaker, etc.), and/or any other suitable feedback system(s). Additionally, the HMI can include input systems, such as touchscreen inputs, buttons (e.g., pushbuttons; integrated into touch-screen display), switches, sliders, and/or any other suitable input system(s). In a first example, the HMI can include a first display (e.g., touchscreen display) on a first end of the system (e.g., facing away from a conveyor) and a second display facing opposite the first end (e.g., facing towards the conveyor region; visible from an opposing side of the conveyor). However, the HMI can include any other suitable set of components.

In variants, the HMI can be height adjustable relative to the frame (e.g., where the frame is freestanding), which may facilitate height adjustment to accommodate a range of users, floor inclination (e.g., where floors may be slanted/inclined to facilitate drainage), and/or otherwise adjustable relative to the frame.

In variants, the HMI can include an emergency stop (or 'disable' button). In an example, an emergency stop can be provided proximal to a refill table (e.g., on a rear side, distal to a conveyor) and/or proximal to a conveyor side and/or conveyor region (e.g., which may allow a user on an opposing side of the conveyor to disable the system). Additionally or alternatively, the HMI can include any other suitable physical, software, and/or other user protections or emergency system, and/or can be otherwise implemented.

However, the system and/or method can include or operate with any other suitable HMI(s).

4. Method

The method S100, an example of which is shown in FIG. 1, can include: receiving sensor measurements S110; maintaining an ingredient model for a foodstuff bin S120; determining a set of ingredient parameters S130; providing feedback based on the ingredient parameters S140; and/or any other suitable elements. The method can optionally include determining a refill event S150; and responding to a refill event S160. However, the method S100 can additionally or alternatively include any other suitable elements. The method can function to facilitate automatic refill notifications at a human-machine interface (HMI) and/or can function to facilitate automatic control adjustments based on ingredient refill events (e.g., without direct programmatic inputs from a user). Additionally or alternatively, the method can function to facilitate provision of user feedback for key ingredient parameters, such as a remaining ingredient amount in a particular foodstuff bin, pick weight/volume statistics (e.g., average, variance; for a robot, over a time period, for an individual pick, etc.), via a human-machine interface (HMI). However, the method S100 can provide any other suitable function(s).

S100 can be performed once, iteratively, periodically, in response to a trigger condition (e.g., push request, pull request, etc.), and/or with any other suitable timing or frequency. In variants, computer processing of various method S100 elements and/or execution of method steps can be centralized (e.g., at an HMI processor, at a computing system of a foodstuff assembly system/module, at a central controller managing a plurality of robotic assembly systems, at a cloud processor, etc.), distributed (e.g., between various processing endpoints, such as between an HMI processor and a computing system of a robotic assembly module), performed locally (e.g., at a robotic assembly system or HMI), performed remotely, and/or can be otherwise suitably executed in any combination or permutation thereof.

Figure 8:
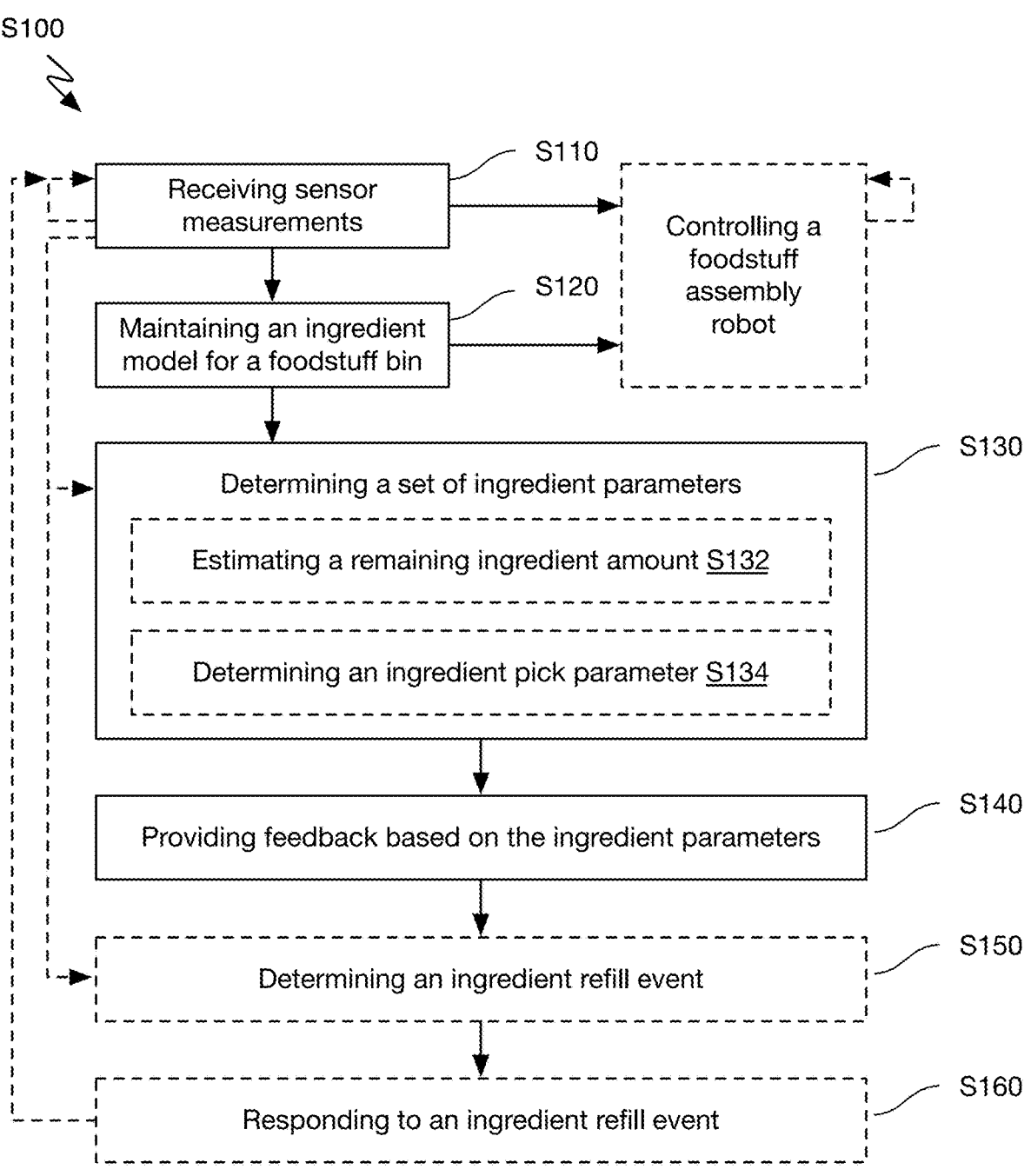
FIG. 8 is a flowchart diagrammatic representation of a variant of the method.

S100 can be executed contemporaneously and/or concurrently with control of the robotic foodstuff assembly system. For example, S100 can be executed while autonomously controlling the robotic foodstuff assembly system to pick bulk ingredients from a foodstuff bin (e.g., a target foodstuff bin; such as an active foodstuff bin and/or a foodstuff bin selected from a set of foodstuff bins, such as by a controller of the foodstuff assembly system; an example is shown in FIG. 8). As a second example, S100 can occur in concert with the method(s) described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference. Alternatively, S100 can occur independently of robot control and/or with any other suitable timing.

In one example, processing for S100 can be executed by a central computing system of a robotic foodstuff assembly module. Additionally or alternatively, processing for S100 can be performed at a computing system of an HMI which is communicatively coupled to a computing system of the robotic foodstuff assembly module. For example, the HMI can be configured to monitor operation of an autonomous foodstuff assembly system based on the sensor measurements (e.g., received from the sensor suite, etc.), independent of the perception, planning, and/or control scheme(s) of the autonomous system.

Receiving sensor measurements S110 functions to determine sensor measurements which can be used to extract information about the ingredients within a foodstuff bin (e.g., to estimate ingredient parameters in S130). Sensor measurements are preferably received from a robotic assembly system 120 (e.g., from sensors and/or a computing system thereof), but can be received from any suitable endpoints (e.g., remote sensors, cloud data storage, etc.). Sensor measurements can be collected by and/or received from one or more: foodstuff bin cameras (e.g., oriented toward a foodstuff bin), robotic arm sensors (e.g., integrated into a robotic arm, such as a force-torque sensor or weight sensor), ingredient bin sensors (e.g., integrated into an ingredient bin and/or a support structure thereof), stereo camera pairs, CCD cameras, CMOS cameras, time-of-flight sensors (e.g., LIDAR scanner, Radar, etc.), a range imaging sensors (e.g., stereo triangulation, sheet of light triangulation, structured light scanner, time-of-flight, interferometry, etc.), light-curtain sensor, force sensor (e.g., force-torque sensor; force-torque sensor, load cell, force transducer, Wheatstone bridge pressure sensor, strain gage, scale, etc.), force-torque sensor; force-torque sensor, load cell, force transducer, Wheatstone bridge pressure sensor, strain gage, scale, inertial sensor, and/or any other suitable sensor(s). However, the sensor measurements can be received from any other suitable set of sensors.

In a first set of variants, S110 can include receiving range imaging measurements from a range imaging sensor (e.g., RGB-d, LIDAR, etc.) oriented towards a superior surface of a foodstuff bin and/or ingredients housed therein.

In a second set of variants, S110 can include receiving measurements from a force-torque sensor and/or load cell (e.g., integrated into a robotic arm and/or end effector) configured to measure a pick weight of food which is supported by and/or contained within an end effector of a robotic food assembly.

In a third set of variants, S110 can include receiving measurements from a force sensor mounted to and/or integrated into the base structure which supports a foodstuff bin (e.g., a pick region of the foodstuff bin; an electronic scale integrated into the based structure) in a pick configuration.

In a fourth set of variants, S110 can include: receiving measurements from a perception system(s) configured to sample images of the foodstuff bin(s) and/or target containers (e.g., within an insertion region along a conveyor line). For example, S110 can receive perception data from the sensors and/or system(s) as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

Measurements can be collected and/or received: synchronously, asynchronously, periodically, aperiodically, in response to satisfaction of an event trigger (e.g., completion of a pick, a time-derivative of a weight measurement satisfies a stability condition, robot is not occluding an image frame, etc.), and/or with any other suitable timing. Measurements can be collected and/or received with a frequency of: less than 0.1 Hz, 0.1 Hz, 1 Hz, 10 Hz, 100 Hz, 1000 Hz, greater than 1000 Hz, and/or with any other suitable frequency. However, measurements can be received with any other suitable timing.

In some variants, sensors (and/or measurements generated therewith) can be calibrated to yield repeatable measurement accuracy (e.g., against a reference standard; prior to execution of the method S100 and/or S110 thereof) of a target parameter (e.g., ingredient weight and/or mass). Calibrated sensors can include: perception sensors, cameras, time-of-flight sensors (e.g., LIDAR), arm integrated force-torque sensors, force (weight) sensors, and/or any other suitable set of sensors. In variants, adjusting measurement outputs by 'zeroing' and/or 'taring' a sensor, such as a force sensor or scale, can be considered forms of calibration (e.g., where the measurement output is an ingredient weight, wherein zeroing and/or taring the scale relative to the laden weight may yield repeatable measurement accuracy for foodstuff ingredient weight). As an example: a force sensor (e.g., electronic scale with a force transducer, load cell, etc.) can be calibrated/tared based on the mass of each empty foodstuff bin prior to ingredient insertion (i.e., tare weight of the foodstuff bin), and/or can be calibrated based on the mass of each individual foodstuff bin (e.g., tared upon initial insertion). However, taring scales for individual foodstuff bins may be tedious, time consuming, and/or unachievable in many cases (such as where foodstuff bins are preloaded with ingredients and used interchangeably without index, for example). Accordingly, in alternative variants, sensors and/or measurements may be uncalibrated (e.g., uncalibrated or not independently calibrated for a particular ingredient type, foodstuff bin, machine configuration, etc.; provide gross measurements without a zero or tare weight reference).

In one set of variants, S110 can include independently measuring the (uncalibrated) weight of a first and second foodstuff bin with a first and second uncalibrated force sensor, respectively. For example, the uncalibrated and/or un-tared weight measurements may yield large static error offsets (e.g., for gross ingredient weight), but may yield high precision and accurately for marginal/differential weights (e.g., sensed mass/weight change between picks; such as individual pick weight, average pick weight for multiple picks; marginal mass change in bulk ingredient weight; etc.). In such variants, the force sensors may be calibrated, zeroed, and/or tared independently of the mass of the foodstuff bin, thus resulting in static error offsets and/or uncalibrated measurements of ingredient weight.

In a second set of variants, nonexclusive with the first, S110 can include receiving gross weight measurements from force sensors without a prior tare weight for the force sensor (e.g., where the force sensor has no tare and/or zero reference; without a prior tare weight relative to a foodstuff bin instantaneously loading the force sensor).

However, any other suitable set of measurements can be received.

Maintaining an ingredient model for a foodstuff bin S120 functions to provide a persistent estimate of a superior surface profile/topography of the ingredients within a foodstuff bin. In some variants, such an ingredient model can be used to estimate ingredient parameters (e.g., such as remaining ingredient amount); however, an ingredient model can additionally be used to facilitate pick target selection and/or motion planning. As an example, the ingredient model can be seen as a "memory" (or "topographic memory") constructed from a plurality of historical sensor measurement frames (e.g., most recent N frames of sensor data received in S110) and/or a previously generated model, which can maintain a persistent awareness of the topography (e.g., surface profile, shape, geometry, etc.) of foodstuff within the foodstuff bin. Alternatively, picking can occur based on perception of a single sampling frame (e.g., single depth image; without use of a model), such as immediately following a refill, during a period when the robot arm does not occlude an imaging system field of view, in response to a satisfaction of a model regeneration event, prior to an initial generation of a model, and/or with any other suitable timing. In some variants, the ingredient model can be maintained by a perception module of a robotic assembly system, but can additionally or alternatively be maintained by the HMI (e.g., or a processor thereof) and/or another processing module. Accordingly, the ingredient model is preferably updated in response to an observed change in the surface profile of the ingredients within the foodstuff bin (e.g., after a single observation, after repeated observation, etc.), and may be updated: once, iteratively, repeatedly, periodically, and/or with any suitable timing/frequency. Additionally or alternatively, the ingredient model may otherwise not be updated during some periods or modes of operation (e.g., while the bin is considered 'empty' and/or there are no valid pick targets available within the foodstuff bin; while the robotic assembly system is picking exclusively from a different bin, etc.).

In variants, the ingredient model can be generated using a set of image(s), received according to S110 from the imaging sensor(s) oriented towards the foodstuff bin (e.g., which depict a physical scene which includes an interior of the foodstuff bin). The field of view of the image scene preferably spans the lateral dimensions of the foodstuff bin(s), but can be entirely bounded within an interior of a container, can extend up to the periphery (e.g., sides) of the container (e.g., include pixels associated with the container periphery), can extend beyond a periphery of a container (e.g., include pixels not associated with the container), and/or any other suitable images. The images can include 2D RGB images, depth images, and/or any other suitable images (e.g., lidar, etc.) or imaging data (e.g., 3D imaging data).

In variants where the physical scene includes a plurality of foodstuff bins, the images can be segmented at the container boundaries and a separate model can be generated for each foodstuff bin. In an example, the image scene is captured with a predetermined field of view in an imaging coordinate frame (e.g., registered for the robot, etc.) and/or can be automatically/dynamically cropped to a predetermined area of interest (e.g., area within bin), and/or otherwise suitably transformed. Alternatively, multiple bins and/or multiple types of ingredients can be modeled together, and subsequently segmented (e.g., during target selection) by ingredient type/region.

Figure 2:
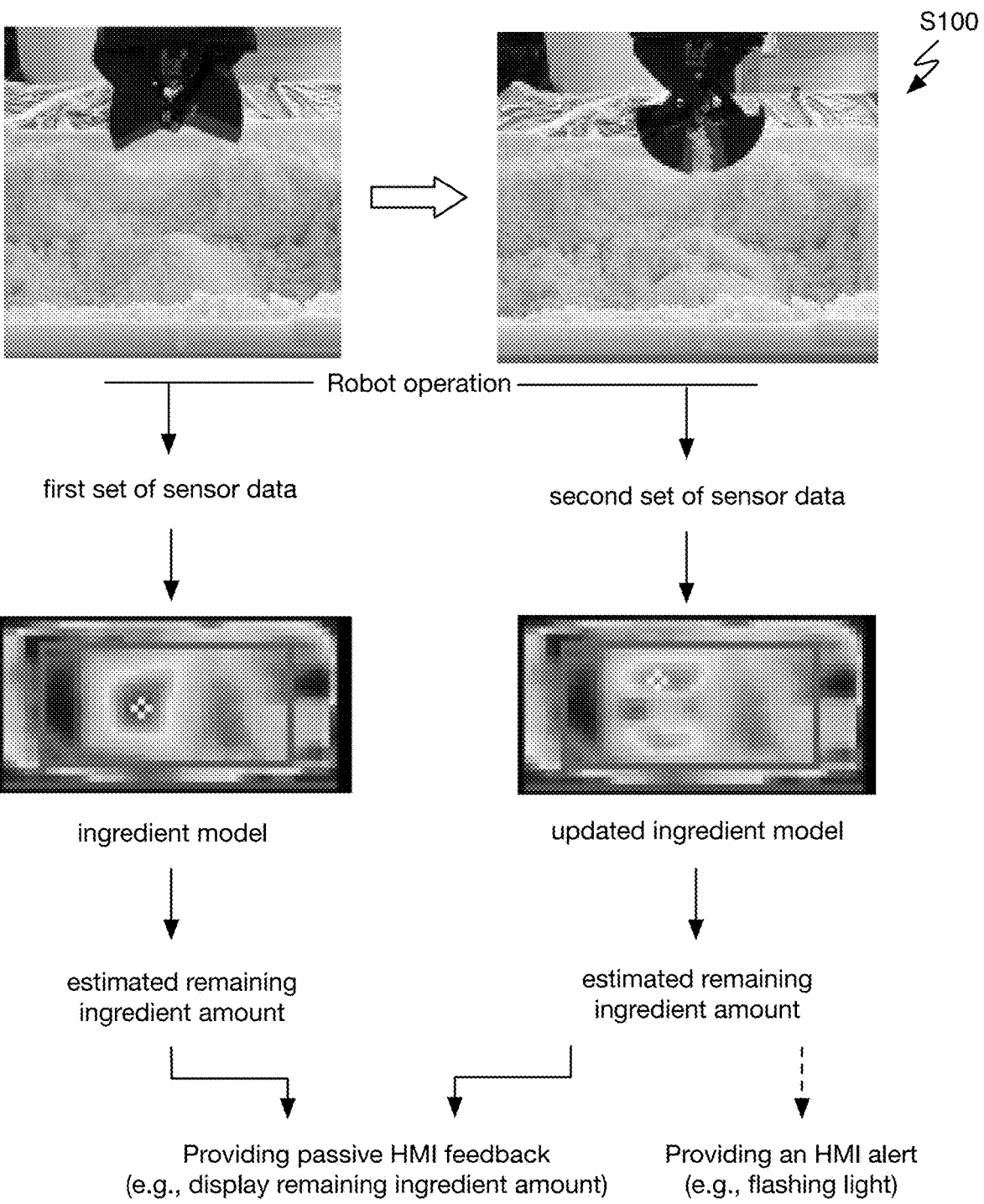
FIG. 2 is a diagrammatic example of a variant of the method.

The ingredient model is preferably a heightmap spanning an interior region of the foodstuff bin (an example of which is shown in FIG. 2), but can additionally or alternatively be any suitable topographic model, 3D surface, depth map, point cloud, voxelization (3D grid) representation, mesh, and/or other suitable representation. The model preferably excludes overhangs (e.g., which may not be directly observable from a top view image), but can additionally or alternatively include overhung sections of ingredients (e.g., where overhung geometry may be utilized in volume-based estimation of bulk ingredient parameters, etc.). However, any other suitable model can be determined.

Images can be transformed into the ingredient model using any suitable image processing and/or filtering techniques (e.g., stereoscopy, photogrammetry, point cloud processing, etc.). The model is preferably generated using a combination of images (e.g., at least three), but can be generated from a single image. The model can include: a set of point clouds, a set of heights (e.g., a z-value for each pixel in the image, for each subregion in the workspace, for each of a set of x,y points, etc.), a surface, and/or have any other suitable topological representation. In examples, the model can be generated by: fitting a surface over a set of points (e.g., uppermost points), by using a space filling curve, by generating a mesh over the points, by estimating the surface normal for each of a set of points and inferring the surface based on the surface normal, and/or any other suitable surface reconstruction technique(s). The ingredient model can be updated: continuously, periodically, repeatedly (e.g., between picks), after each pick, after a refill/human servicing event, in response to satisfaction of an update threshold (e.g., more than a predetermined number of detections at a coordinate position deviating from the model), in response to a manual input at the HMI (e.g., associated with a refill; manual model update and/or regeneration request; etc.) and/or with any other suitable timing. However, the model can additionally or alternatively be regenerated periodically (e.g., after each pick), in response to a pick amount deviating from a target pick amount, and/or in response to any other suitable event(s). In variants, when the model is updated, the height (or depth) at each position of the model is constrained to be monotonically decreasing in height (monotonically increasing in depth) as a function of time (e.g., between refill events). In variants, the model can be regenerated (e.g., not based on previous images and/or historic model states) in response to determination of a regeneration event (e.g., satisfaction of a threshold deviation from the specified ingredient amount, power-reset, in response to determination of a refill event, etc.). However, the model can be otherwise maintained and/or updated.

In variants, the images can be filtered to remove robot arm detections, intrusion detections, and/or other occlusion detections (e.g., a human hand), such as by segmenting out regions of an image with height/depth measurements in excess of a predetermined threshold (e.g., above a top plane of the foodstuff bin, above a previous surface height of the model, etc.). In variants, the images can additionally or alternatively be filtered based on the color image, such as segmenting out pixels which deviate from a color of the foodstuff by more than a predetermined threshold (e.g., color distance within sRGB space, etc.), segmenting out object detected using an object detector, and/or otherwise removing extraneous height/depth measurements. Extraneous depth signals can additionally or alternatively be neglected or invalidated using intrusion detection based on the imaging data and/or any other suitable sensor measurements (e.g., light curtain, etc.). For example, all measurement signals, such as height or depth returns, within a protected zone (e.g., an anecdotal "DMZ" with SW protections against intrusions) can be invalidated or neglected.

In some variants, the ingredient model for a particular bin maintained in S120 can be used both to generate HMI feedback (e.g., ingredient parameter estimates) and for robotic planning and control (e.g., pick target selection, trajectory planning, etc.). However, the ingredient model can alternatively be specific to the HMI; and/or the HMI and the control system of a robotic assembly system can alternatively maintain a separate ingredient model(s).

An ingredient model is preferably maintained for each individual ingredient bin within a robotic assembly system (e.g., with 1:1 correspondence; for robotic assembly systems housing a plurality of foodstuff bins), however the ingredient models can alternatively be fused into a single model (e.g., with multiple pick regions which may be subsequently segmented) and/or can be otherwise suitably maintained.

As an illustrative example, the ingredient model of S120 can facilitate maintaining belief about the status of ingredients and/or fill level of a foodstuff bin which is obscured or occluded for a particular scene. For example, a robot arm may at least partially occlude imaging sensors and/or images during most (all) portions of a pick/place cycle. As a result, persistent state awareness and/or modeling (independently of the robot arm operational trajectories) may be particularly advantageous, since the surface of the foodstuff may be only partially observable within individual image frames. Maintaining belief and/or persistent state awareness can be particularly advantageous because it can allow ingredient parameter determination and/or associated feedback provision (e.g., according to S140; provision of refill notifications) based upon partial/incomplete imaging data (e.g., in real time, substantially continuously, etc.), without needing to delay these downstream operations while waiting for a foodstuff bin or the ingredients therein to be entirely unobstructed (e.g., which may be uncommon; particularly in cases where the arm is mounted above the ingredient bin, proximal to a display of the HMI and distal to a conveyor line, an example of which is shown in FIGS. 6A-6D). In particular, earlier provision of refill notifications (e.g., for even a few pick cycles) may significantly reduce instances of downtime (where delaying for one or two cycles may overburden downstream systems or human operators which may result in further delays; stopping an industrial conveyor line may create significant workflow challenges along other portions of the line, both upstream and downstream).

In one set of variants, the ingredient model can be determined and/or maintained as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

In an example, S120 can include maintaining a first and second ingredient model of bulk ingredients within a first foodstuff bin and a second foodstuff bin (e.g., removably housed within a foodstuff assembly system and/or a pick region of a refill table thereof), respectively, based on sensor measurements received from a perception system (e.g., one or more RGB-d cameras, LIDAR, etc.) of the foodstuff assembly system.

However, the ingredient model(s) can be otherwise suitably maintained.

Determining a set of ingredient parameters S130 functions to determine parameters which will be surfaced to human operators (provided as feedback) via the HMI and/or which can facilitate timely ingredient refills. Additionally or alternatively, ingredient parameters can be used to audit and/or validate operation of the robotic assembly system (e.g., for QC/QA, etc.). Ingredient parameters can include: bulk/gross ingredient parameters (e.g., remaining ingredient amount within a foodstuff bin, total initial ingredient amount within a foodstuff bin, etc.), marginal/differential ingredient parameters (e.g., change in ingredient amount within estimated volume, individual pick amount, average pick amount, etc.), ingredient pick parameters (e.g., operational pick statistics for an ingredient, such as mean pick amount, median pick amount, variance or standard deviation in an ingredient pick amount, etc.), an ingredient amount (remaining) within a foodstuff bin (e.g., total ingredient volume, amount within a workspace of robot, accessible to robot with an end effector or food utensil, number of picks left, etc.), predicted operational parameters based on ingredients (e.g., predicted time-to-refill, predicted picks remaining, etc.; based on secondary/contextual robot information, based on status of robotic assembly system and/or historical operation of robotic assembly system, such as insert frequency, average pick amount, conveyor line operating rate, etc.), ingredient characteristics (e.g., ingredient density, etc.), and/or any other suitable ingredient parameters. Ingredient parameters can be determined based on: sensor measurements received in S110, the ingredient model(s) for a foodstuff bin(s) (e.g., maintained according to S120), supplementary/contextual information (e.g., historical operational data for a robot, predefined ingredient characteristics, robot status, end effector type, operational workspace, etc.; target pick amount, pick frequency, ingredient density, etc.), and/or based on any other suitable information/data. Ingredient parameters can be determined: continuously, periodically, repeatedly, synchronously, asynchronously, concurrently with operation of a robotic assembly system (e.g., during autonomous control of the robotic foodstuff assembly system), during an ingredient pick, between ingredient picks, after an ingredient pick, in response to a pull request (e.g., from an external system, such as a remote verification/validation system) or operator request (e.g., via an HMI input), during a refill event, after a refill event, and/or with any other suitable frequency/timing.

S130 can include estimating a remaining ingredient amount S132 which can be used to facilitate timely ingredient refills of depleted foodstuff bins (e.g., with continuous operation of the robotic assembly system). Additionally or alternatively, S132 can facilitate feedback provision via the HMI in accordance with S140 and/or can be used to generate refill notifications/alerts. In an example, the remaining amount of bulk ingredients can be estimated as one or more of: a percentage of reachable volume, a remaining number of picks, or a remaining time to refill.

S132 preferably estimates the amount of remaining ingredients which can be picked (i.e., remaining number of picks accessible to the robot). For example, ingredients stuck to the walls of a foodstuff bin or located near the corners and base of the container may be inaccessible or increasingly difficult for the robot to pick, or pick consistently, with an end effector. Such ingredients may be residual when the foodstuff bin is treated as 'empty' for the purpose of pick planning and/or robot control. Additionally, the robotic assembly system can impose collision constraints to avoid contacting the foodstuff bin(s) in the pick configuration, which may render various portions of ingredients 'inaccessible' to a robot and/or an end effector thereof. Thus, it can be advantageous to account for residual ingredients when estimating the amount of ingredients in a foodstuff bin, in order to generate meaningful refill notifications or ingredient parameter feedback. However, the amount of ingredients can alternatively be estimated based on all ingredients within the container (e.g., entire weight, volume, etc.), or can be otherwise estimated.

Figure 10:
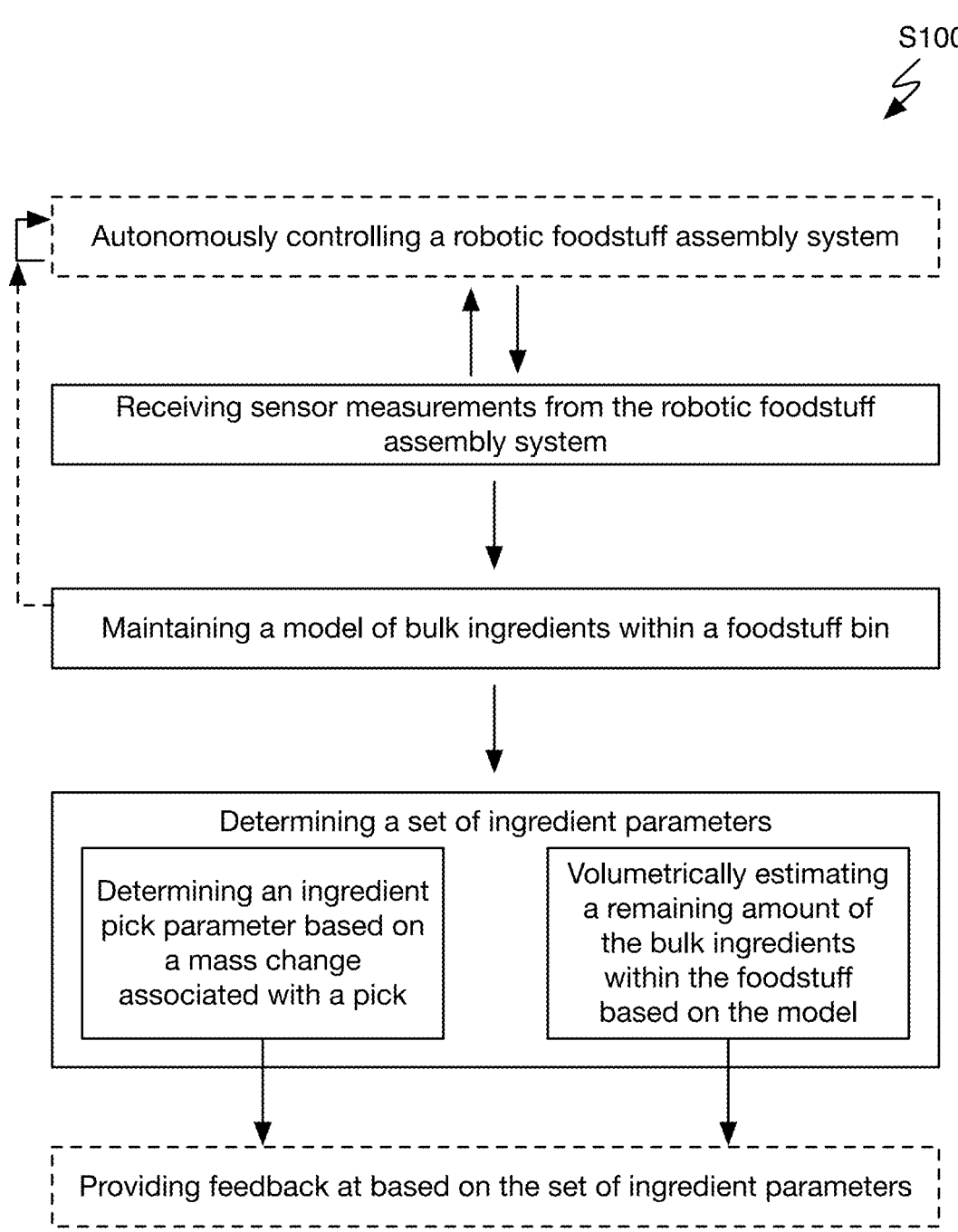
FIG. 10 is a flowchart diagrammatic representation of a variant of the method.

The amount of ingredients remaining is preferably estimated volumetrically based on the ingredient model (e.g., an example is shown in FIG. 2; a second example is shown in FIG. 10), but can alternatively be estimated by ingredient mass/weight (e.g., where a foodstuff bin weight is precalibrated at an 'empty' state, with or without ingredient residue), a combination of volumetric-based and mass-based estimation, and/or can be otherwise suitably estimated.

In a first variant, S132 can estimate the amount of ingredients based on an intersection of the volume enclosed by the superior surface topography of the ingredient model (e.g., maintained by S110) and a control boundary for a robot end effector (e.g., a food utensil) within the corresponding foodstuff bin. The control boundary can be predetermined (e.g., accessed from a local memory; stored in association with the current end effector; etc.), received from a controller of the robotic assembly module, dynamically determined based on the ingredient model and/or end effector type, and/or can be otherwise determined. As an example, the control boundary can be a control boundary for a current operational workspace of the robot, wherein the remaining ingredient volume can be estimated by determining the intersection between a first volume of the ingredient model and the current workspace volume for the robotic assembly system.

The first variant can be particularly advantageous in circumstances where a new ingredient is being picked, since it may not utilize any ingredient-specific information (e.g., such as historical pick data for an ingredient) to calibrate the estimate. However, historical pick data (e.g., average remaining ingredient, a loss adjustment factor, etc.) can alternatively be utilized to further refine and/or improve the estimate in the first variant.

In a second variant, the amount of remaining ingredients can be estimated by adjusting the volume of the ingredient model based on a remnant volume calibration parameter. The remnant volume calibration parameter can be predetermined (e.g., mean or median volume of unreachable 'remnant' ingredients for a prior foodstuff bins; predetermined per robot, per foodstuff bin size, per ingredient, and/or per end effector class), dynamically determined (e.g., based on distribution of ingredients or 'flatness' of superior ingredient surface, based on an initial condition of the ingredients, a pick heatmap, etc.), static (e.g., fixed linear adjustment), variable (e.g., multiplicative adjustment based on an amount of ingredients) and/or otherwise suitably determined. As an example, the amount of remaining ingredients for a foodstuff container can be estimated based on the total ingredient volume (e.g., of the ingredient model) minus a historically unreachable volume associated with the ingredient type, end effector, and/or other configuration parameters. As a second example, the remnant ingredient volume parameter can be a predetermined (e.g., for a particular ingredient and/or tool type; based on historical data; etc.) and can optionally be tuned/refined for a particular line run/skew (e.g., ingredients often vary based on daily preparation and/or ambient factors such as humidity and temperature; this can be accounted for by weighted averaging or otherwise adjusting a predetermined calibration parameter associated with the ingredient and/or tool type based on the historical remnant volume for prior bins emptied within the same run). As a third example, remnant volume parameter can be based on a remnant model which models remnant ingredients for a bin[s] considered 'empty' based on the respective ingredient model(s). In this example, a remnant model can be predetermined (e.g., at a start of a refill cycle), wherein, while the foodstuff assembly system remains in a machine configuration, the remnant model is dynamically refined based on at least one prior ingredient model, wherein the at least one prior ingredient model is associated with an unpickable control condition (i.e., when the bin is empty).

In a third variant, the amount of ingredients remaining can be estimated based on a pick heatmap and/or a set of candidate pick targets (e.g., received from a controller of the robotic assembly system). For example, if the set of candidate pick targets includes at least one pick target for each of a plurality of grid regions (e.g., quadrants, etc.), the size of the set may be used to set a lower bound for a number of remaining picks and/or a remaining ingredient volume (e.g., particularly as the foodstuff bin approaches an 'empty' state with no available pick targets). For instance: if there are at least four pick targets for a foodstuff bin (e.g., each within a distinct/disjoint region; one in each quadrant), at least four additional picks may be available for the foodstuff bin and the remaining ingredient volume can be estimated to be at least four times the target pick volume. Conversely, if the set of candidate pick targets for a foodstuff bin is null, the remaining ingredient amount can be set to zero and the foodstuff bin may be evaluated as "empty."

S132 preferably estimates the remaining ingredient amount in terms of a bulk ingredient parameter, but can alternatively estimate the ingredient amount in terms of an initial condition (e.g., initial ingredient volume), predefined range (e.g., fractionally or as a percentage; similar to a gas tank or battery state of charge in a motor vehicle), robot parameter (e.g., pick cycles), temporal parameter (e.g., remaining time to refill; time to empty), and/or other suitable parameter. For example, the remaining ingredient amount can be estimated as: a volume, a weight, a number of picks (e.g., dividing a remaining volume by a target pick volume), a time-to-empty (e.g., multiplying a number of picks by a cycle time; dividing by an ingredient throughput rate, etc.), a percentage (e.g., of a fixed range or a variable range based on the initial volume, etc.), and/or in any other suitable format.

However, the remaining ingredient amount can be otherwise estimated.

S130 can include determining an ingredient pick parameter S134 which functions to validate system pick accuracy (e.g., mass/volume/quantity within a threshold tolerance, such as within 10% of a predetermined amount) and/or facilitate system auditability (e.g., pick amounts can be automatically validated/verified). Additionally or alternatively, ingredient pick parameters can be used to improve pick control algorithms and/or pick selection algorithms (e.g., for CV-based pick selection). Ingredient pick parameters are preferably determined based on measurements received according to S110, but can additionally or alternatively be determined based on pick timing information and/or control instructions (e.g., from a controller of a robotic assembly system), ingredient characteristics (e.g., predetermined ingredient density) and/or any other suitable information. Ingredient pick parameters can include: (individual) pick amount (e.g., pick weight, pick mass, etc.), ingredient pick statistics (e.g., mean pick weight, mean pick volume, median pick weight, pick weight variance, etc.), and/or any other suitable parameters. Ingredient pick parameters can be determined once (e.g., for each pick cycle; for a refill/cycle of an foodstuff bin; for a particular line session; etc.), repeatedly, periodically, in response to completion of a pick, in response to determining an ingredient refill event, in response to a user request (e.g., manual input at HMI, audit request, etc.), and/or with any other suitable frequency/timing.

The ingredient pick parameters are preferably estimated by ingredient weight/mass using force (and/or torque) feedback from the robotic assembly system (e.g., measurements received in S110), but can alternatively be estimated volumetrically, determined using a combination combination of volumetric-based and mass-based estimation, and/or can be otherwise suitably estimated.

In a first variant, the ingredient pick parameters can be determined using measurements received from a force sensor beneath the foodstuff bin (e.g., a foodstuff bin scale; received during S110; an example is shown in FIG. 5) based on a differential comparison of foodstuff bin weight before and after pick execution (e.g., neglecting force readings associated with end effector ingress into the foodstuff bin and any associated shock, measurement hysteresis, temporal effects, etc.). As an example, an ingredient weight for an individual pick can be determined by evaluating the difference between a first bulk ingredient weight, sampled prior to an ingredient pick, and a second bulk ingredient weight sampled after the ingredient pick and preceding any subsequent ingredient pick (e.g., during ingredient insertion, etc.; each bulk ingredient weight evaluated at a time period with less than a threshold rate of change of a measurement, such as a slope of less than 0.1%/sec, at a substantially plateaued force measurement for a foodstuff bin scale, etc.).

In a second variant, ingredient pick parameters can be determined based on measurements from integrated sensors coupled to a robot end effector (e.g., a force-torque sensor; a load cell).

However, the ingredient pick parameters can be otherwise determined, or otherwise may not be determined (e.g., in one or more variants or operating modes).

In one set of variants, S130 can include estimating a time remaining until a foodstuff bin is 'empty' (e.g., with all remnant ingredients are inaccessible and/or where no picks of the target pick amount can be executed). For example, the time remaining can be dynamically estimated based on inferred contextual information associated with the adjacent conveyor line (e.g., observed throughput rate, such as in containers filled/completed per minute; as derived from CV analysis of sensor data, received from a controller of the robotic assembly system, etc.). Additionally or alternatively, the estimated time remaining can be estimated based on a dynamically estimated cycle time and/or ingredient throughput rate (e.g., based on picks per minute; rate of change as a fraction of remaining ingredient volume, etc.). However, the estimated time remaining may not be explicitly estimated (e.g., where notifications/triggers may be entirely based on volume remaining) and/or can be otherwise suitably estimated based on any other suitable information.

However, ingredient parameters can be otherwise suitably determined.

Providing feedback based on the ingredient parameters S140 functions to provide feedback to operators to facilitate timely ingredient refills (e.g., based on the ingredient parameters; to facilitate continuous operation of a robotic assembly system) and/or auditing. Additionally or alternatively, S140 can function to provide persistent, non-invasive, and/or non-distracting feedback to assembly workers (e.g., which they may be responsible for managing, to minimize "alarm fatigue," etc.). Feedback is preferably provided locally via the HMI 110 at a visual interface or display (e.g., arranged outside of the workspace of the robot, proximal to the refill region and/or foodstuff bins in the refill configuration), but can alternatively be transmitted to a remote endpoint (e.g., remote monitoring station, cloud monitoring, etc.; wired or wirelessly) and/or can be otherwise suitably provided. Feedback is preferably provided continuously (e.g., continuously/passively displaying ingredient parameter values, such as a remaining ingredient amount), but can alternatively be provided in response to a user request via the HMI (e.g., audit request, etc.), periodically, repeatedly, in response to a determination of a refill event, and/or with any other suitable frequency/timing. In a specific example, an HMI can display each foodstuff bin along with a visualization of the amount of remaining ingredients (e.g., fill level, remaining picks, time remaining to empty), and can optionally display pick statistics for the system in the current configuration (e.g., pick variance, mean pick deviation, etc.).

Feedback provided via the HMI can additionally include or be associated with: ingredient parameters (e.g., remaining ingredient amount, ingredient pick parameters/statistics, etc.), operational parameters (e.g., machine status, configuration, registration parameters; a foodstuff bin or pick region which has been selected for a pick target, a.k.a., 'active foodstuff bin'; etc.), configuration parameters (e.g., tool/ utensil type; ingredient type; target pick amount; current meal/recipe; etc.), restrictions (e.g., inactive/locked foodstuff bin), audit parameters (e.g., ingredient pick statistics, total deposits in a session, deposits per minute, deposits over last minute, etc.), graphs (e.g., a graph of pick amount over a set of the last N picks, such as last 10 picks, last 50 picks, etc.; rolling average trend line for pick amount, central tendency graphs, etc.), pick trends (e.g., central tendency metrics, such as displayed in a graphical and/or numerical form), notifications/alerts (e.g., a refill notification and/or refill alert), and/or any other suitable feedback.

In variants, S140 can optionally include providing an alert (a.k.a., refill notification) based on at least one ingredient parameter satisfying an alert condition, which functions to notify users (e.g., line operators) of the alert condition. In a first example, S140 can provide an alert based on an ingredient amount within a food container falling below a predetermined threshold (e.g., 20%, less than 5 minutes to empty, less than 10 picks remaining, etc.). In a second example, S140 can provide an alert based on a determination that a foodstuff bin is empty (e.g., 0 remaining pick candidates, remaining amount is 0, etc.). In a third example, S140 can provide an alert (e.g., a service alert) based on an ingredient pick parameter failing to satisfy a predetermined requirement (e.g., maximum variance, etc.). Alerts are preferably provided visually (e.g., via HMI display or alert indicator light), but can additionally or alternatively be provided auditorily, haptically, via wireless transmission (e.g., SMS alert, email alert, other notification, etc.), and/or via any other suitable communication/notification media. Alerts are preferably provided locally (e.g., at an HMI proximal to and/or physically connected to a robotic assembly system), but can additionally or alternatively be provided at a remote endpoint (e.g., central monitoring/control station, etc.).

In an illustrative example, the feedback provided during S140 can include a first set of feedback (e.g., volumetric and/or perception-based feedback; which may be relatively less precise) and a second set of feedback (e.g., uncalibrated weight-based feedback; granular feedback), which are associated with disjoint sets of sensor measurements/data from the sensor suite.

Feedback, such as a refill notification, can be provided to a user/operator via any suitable set of feedback systems, such as a via physical HMI feedback mechanisms (e.g., display, light tower, stack light, audio speaker/emitter, radio, haptics mechanisms, etc.), digital feedback mechanisms (e.g., wireless signal, push notification, etc.) and/or any other suitable feedback systems. More preferably the HMI feedback is multi-modal (e.g., where the same information is provided via several multiple modes of HMI feedback/ communication), but the feedback can alternatively be provided via a single communication mode (e.g., single mode, such as visually; wirelessly transmitted; etc.), and/or otherwise provided. HMI feedback can include: alpha-numeric feedback, iconographic feedback, color-coded feedback, visual feedback, auditory feedback, haptic feedback, and/or any other suitable types of feedback. For example, the remaining ingredient amount can be provided with displayed alpha-numeric characters, an iconographic representation (e.g., level/fill indicator icon; bouncing arrow/symbol to indicate the ingredient amount is being depleted and/or is associated with an active pan; etc.), color-coded alert (e.g., color coded status associated with the ingredient amount; such as green above a threshold fill level, yellow below the threshold, red when a foodstuff bin is empty, flashing red when both foodstuff bins are empty, etc.), an auditory alarm (e.g., beeper, klaxon, buzzer, etc.; when an empty foodstuff bin may be associated with an imminent line stoppage; etc.), and/or any other suitable forms of feedback.

In a first set of variants, the feedback provided at the HMI includes a dynamically estimated number of remaining picks within each foodstuff bin, wherein the number of remaining picks is based on a target pick amount.

In a second set of variants, nonexclusive with the first, the feedback provided at the HMI includes a dynamically estimated time remaining until the first foodstuff bin is empty, wherein the time remaining is dynamically estimated based on inferred contextual information associated with an adjacent conveyor line.

In a third set of variants, nonexclusive with the first and second sets, providing feedback at the HMI include: in response to at least one ingredient parameter satisfying a trigger condition, automatically providing a user alert via the HMI.

In a fourth set of variants, nonexclusive with the first, second, and third sets, providing feedback at the HMI includes simultaneously displaying: the remaining amount of bulk ingredients within the foodstuff bin; the amount of bulk ingredients within the auxiliary foodstuff bin; and an ingredient pick parameter.

In a fifth set of variants, nonexclusive with the first, second, third, and fourth sets, the HMI is configured to display a graph of the ingredient pick parameter across a set of picks along with at least one central tendency metric of the ingredient pick parameter for the set of picks (e.g., a graph trendline of the pick amount for the previous N picks).

In a sixth set of variants, nonexclusive with the first through fifth set, S140 can include automatically providing an alert via the HMI in response to satisfaction of a trigger condition associated with a remaining time until conveyor line stoppage (e.g., based on a gross ingredient parameter). For example, the alert can be a beep, klaxon, or other auditory alert associated with an imminent conveyor stoppage.

However, providing feedback can include any other suitable alerting and/or user notifications.

Optionally determining a refill event S150 can serve as a functional user input to the HMI and/or robotic assembly system. Additionally or alternatively, determining refill events can be used to initiate adjustments to robotic planning and/or control (e.g., to avoid interfering with the user), to appropriately update an ingredient model(s), and/or to appropriately update various feedback parameters (e.g., reset alerts, reset ingredient fill level, reset ingredient pick statistics, etc.) in accordance with S160. Refill events are preferably determined automatically (e.g., without necessitating a direct programmatic input at an HMI) based on a detection of a physical transformation of a foodstuff bin and/or an refill action by a user (e.g., adding ingredients to a foodstuff bin, moving hand towards foodstuff bin, etc.), but can additionally or alternatively be determined in response to a direct user input to an HMI (e.g., via an associated button push or input at a touchscreen interface, etc.), and/or can be otherwise suitably determined.

Refill events are preferably determined entirely based on the measurements received during S110 (e.g., current measurements; last N measurement data frames, etc.), but can additionally or alternatively be determined based on an input from a perception subsystem of a robotic assembly system (e.g., employing CV-based monitoring of the workspace), a manual input received at an HMI, a combination thereof, and/or any other suitable data/information. In a first variant, a refill event can be determined based on a sensed weight at a force sensor (e.g., scale) beneath the ingredient bin, such as a step increase in sensed weight (e.g., satisfying a predetermined threshold or event trigger, indicating the foodstuff bin is being refilled in-situ; over a longer timespan than would be associated with a pick, after 1 second, of greater magnitude than would be associated with a pick force, occurring asynchronously with a pick, etc.) and/or a sensed weight falling below a threshold (e.g., indicating the bin has been transformed from a pick configuration into a refill configuration; predetermined threshold or dynamically determined threshold based on a current remaining ingredient amount and/or current weight measurement, etc.). In a second variant, a refill event can be determined by detecting that the foodstuff bin (e.g., in a refill configuration) and/or a user is occupying a refill region of a foodstuff assembly system (e.g., an example is shown in FIG. 6A), such as using a measurement from a second force sensor, proximity sensor, contact sensor, a light-curtain, and/or any other suitable sensor(s) configured to detect a transformation of a foodstuff bin from a pick configuration, within a pick region, into a refill configuration (e.g., an example is shown in FIGS. 6A-6D; beyond the pick region). In a third variant, a refill event can be determined based on range imaging data, such as a detection of an occlusion of the foodstuff bin (e.g., above a height of the ingredient model) which is not associated with a corresponding robotic arm pose. In a fourth variant, a refill event can be determined with a CV-based detection of a user (e.g., user extremity—such as an arm or hand) based on imaging data from a camera or other imaging sensor oriented towards a foodstuff bin.

Refill events are preferably determined for individual foodstuff bins and/or subsets of foodstuff bins (e.g., left and right refill events are determined separately; which may facilitate continued operation of a robotic assembly module within a workspace associated with a remainder of the foodstuff bins), but can alternatively be determined for the entire robotic assembly module (e.g., when determined via one or more sensory modes; in one or more modes of operation) and/or can be otherwise suitably determined.

Figure 6C:
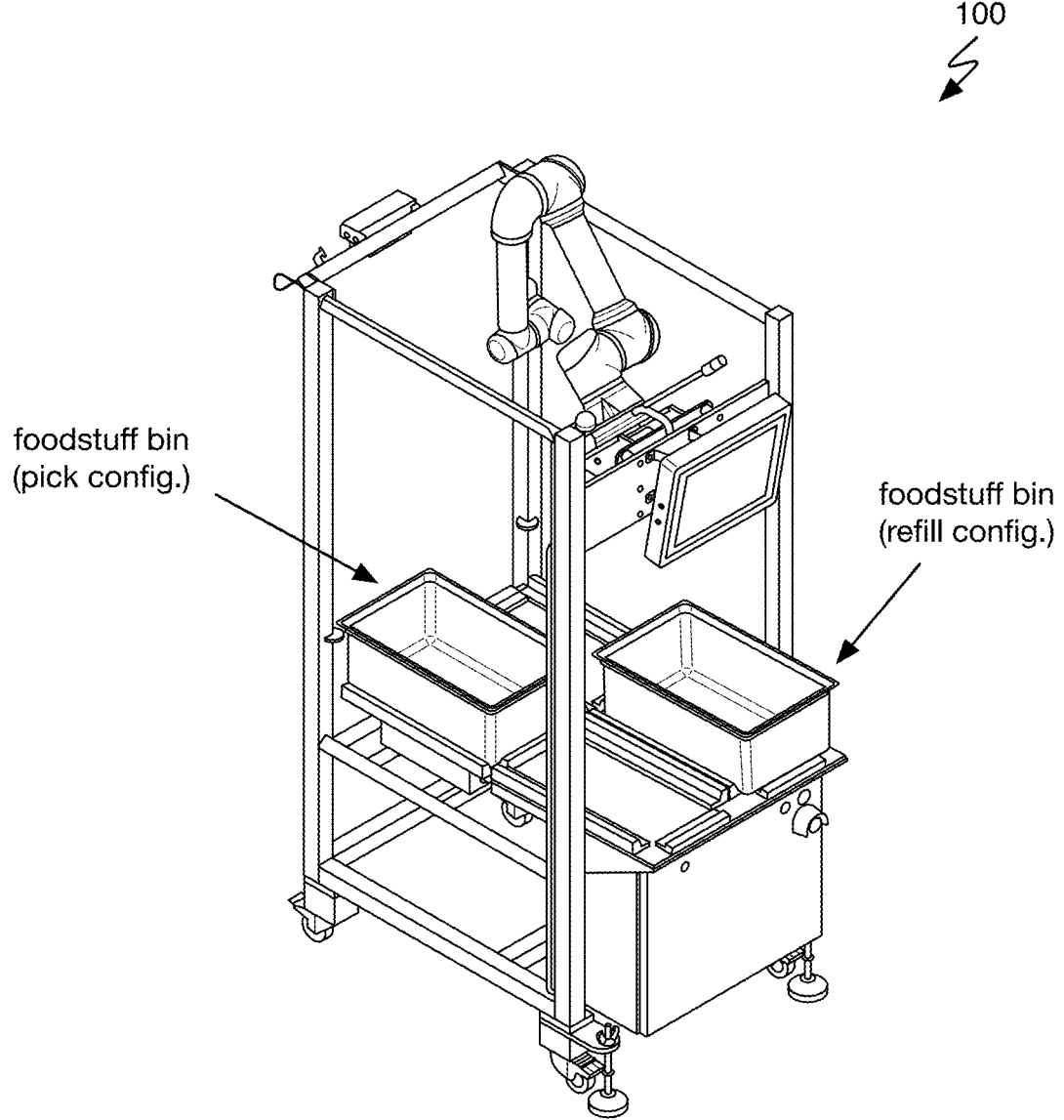
FIG. 6C is an isometric view of a variant of the system illustrating one foodstuff bin in a pick configuration and one foodstuff bin in a refill configuration.
Figure 6D:
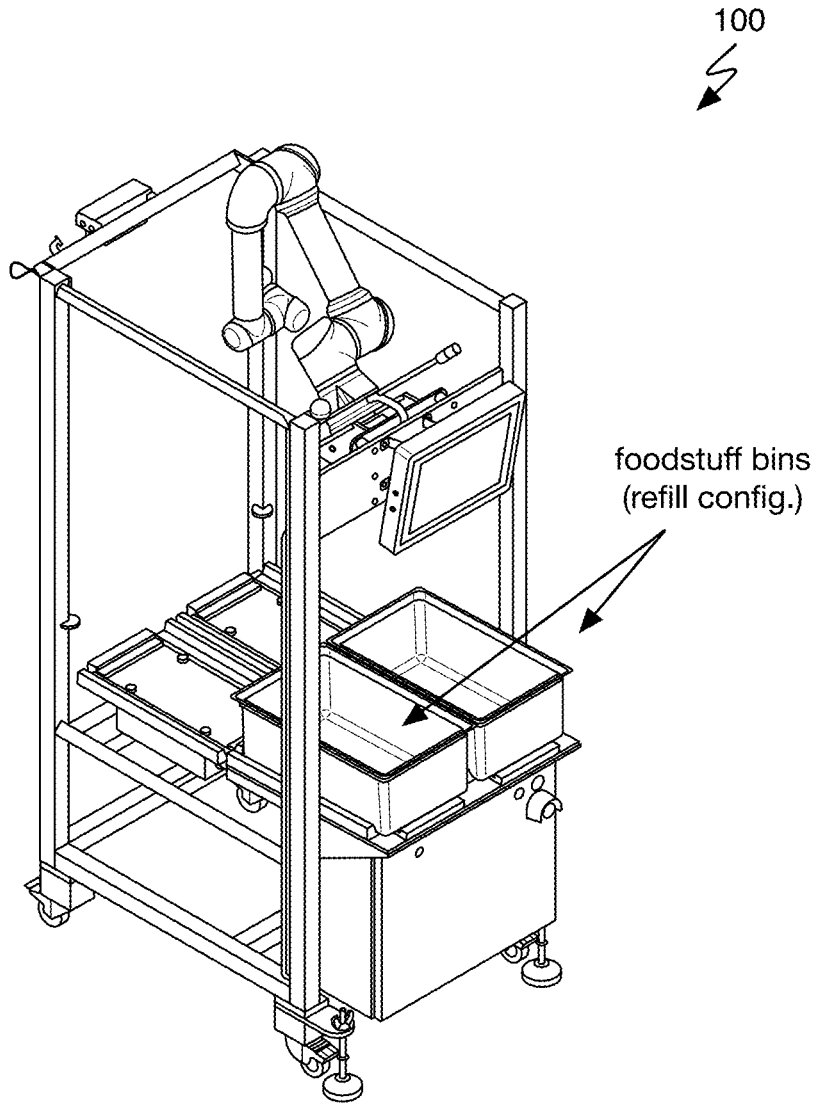
FIG. 6D is an isometric view of a variant of the system illustrating foodstuff bins in a refill configuration.

In a specific example, a refill event can be determined for a foodstuff bin based on a transition of a foodstuff bin from a pick configuration (e.g., examples are shown in FIGS. 6B-C) into a refill configuration (e.g., with or without a user entering a workspace of the robot) and/or an arrangement of the foodstuff bin within the refill configuration (e.g., examples are shown in FIGS. 6C-D)

In one variant, a refill event is associated with a manual slide transition of a foodstuff bin from a pick region, within a workspace of the foodstuff assembly system, to a refill region, beyond the workspace of the foodstuff assembly system. In an example, the refill event comprises a transition of the foodstuff bin along a refill table as described in U.S.

application Ser. No. 18/114,892, filed 27 Feb. 2023, titled "SYSTEM AND/OR METHOD FOR REFILLING ASSEMBLY SYSTEMS," which is incorporated herein in its entirety by this reference. In a second example, nonexclusive with the first, wherein, when arranged in a first configuration, the first foodstuff bin is supported by a first force sensor and laterally constrained within a pick region by a set of locating features proximal to a base of the foodstuff bin, wherein a lip of the foodstuff bin is accessible to a user in the first configuration.

However, a refill event can be otherwise suitably determined.

Optionally responding to a refill event S160 functions to adjust to robotic planning and/or control to avoid interfering with the user and/or pick errors during refill. Additionally or alternatively, S160 can function to appropriately update an ingredient model(s), and/or to appropriately update various feedback parameters (e.g., reset alerts, reset ingredient fill level, reset ingredient pick statistics, etc.) based on the refill event.

In one set of variants, S160 can include restricting operation of the robotic assembly system. For example, an operational workspace of the robotic assembly system can be restricted during S160 to exclude the foodstuff bin and/or space above the pick region associated with the foodstuff bin. Additionally or alternatively, the pick target selection may be restricted (e.g., to avoid picking from a particular foodstuff bin; such as by 'locking' a particular foodstuff bin or directing selection to a different foodstuff bin) in S160. The operation can be restricted until a trigger condition is satisfied, which can include: a temporal trigger (e.g., a 30 second delay after ingredient refill event determined; delay after last user detection within/around the workspace), a manual input trigger (e.g., user input provided at the HMI, indicating the user has vacated the workspace, etc.), a foodstuff bin configuration trigger (e.g., foodstuff bin detected at the pick region, etc.), any combination of the aforementioned conditions, and/or any other suitable trigger condition(s). Additionally or alternatively, the operation of the robotic system can be restricted and/or directed based on manual inputs via the HMI (e.g., a user may digitally direct, lock, and/or unlock robotic pick selection for a particular bin via the HMI), which can allow users to direct robot responses to refill events and/or operation during other portions of the method (e.g., during default operation; allowing a user to lock a foodstuff bin prior to adding ingredients in-situ to avoid disruption to pick operation; direct selection of pick targets from a particular foodstuff bin; etc.).

Additionally or alternatively, variants can facilitate non-restrictive target selection via the HMI (e.g., direct the robot to preferentially select targets from a particular foodstuff bin; without locking a foodstuff bin). For example, user may direct the robotic assembly system to selectively pick from a foodstuff bin in order to empty a ingredients which are approaching a replacement time threshold (e.g., maximum time a hot ingredient can be maintained above a temperature threshold; time threshold before a chilled/frozen food may melt or degrade; etc.) and/or to empty the bin prior to a manual refill (e.g., after the user has pushed foodstuff off of the walls, etc.). Additionally or alternatively, the robotic foodstuff assembly system can be configured to automatically select pick targets from a bin with the least remaining ingredients (e.g., nearest to empty), and/or based on other ingredient parameters (e.g., longest time since refill; etc.) according to an automatic pick selection strategy (e.g., decision tree, heuristic, ML-based, programmatic, etc.; predetermined and/or user configured via the HMI, etc.).

However, variants can otherwise restrict and/or direct operation of the robotic assembly system.

In a second set of variants, S160 can include updating and/or regenerating an ingredient model. For example, where the ingredient model may be confined to a monotonically decreasing height between refill events, in response to detection of a refill event (and/or a period immediately thereafter), the surface height of the ingredient model can be redetermined at a new height exceeding the height prior to detection of the refill event (e.g., based on the next N imaging frames).

In a third set of variants, S160 can include updating ingredient parameters and/or initial conditions used to calculate various ingredient parameters (e.g., where the remaining ingredient amount is dynamically determined on a sliding scale, for instance).

However, S160 can include any other suitable response(s) to a refill event. Alternatively, refill events may not be determined (and/or responded to) in one or more instances of the method, or one or more operating modes of the system.

The method S100 can optionally include or be executed in conjunction with controlling the robotic foodstuff assembly system (e.g., facilitating ingredient picking from the foodstuff bin and/or insertion into a container on a conveyor line). Any and/or all portions of the method S100 can occur contemporaneously, concurrently with, and/or in response to control of the robotic foodstuff assembly system, such as in accordance with the method(s) described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for a robotic foodstuff assembly system, comprising:
   receiving sensor measurements from a sensor suite of the foodstuff assembly system, the sensor suite comprising:
      a first and second force sensor configured to independently measure an uncalibrated weight of a first and second foodstuff bin, respectively; and
      a perception system, configured to sample images of a conveyor region and the first and second foodstuff bins;
   maintaining a first and second ingredient model of bulk ingredients within the first and second foodstuff bins, respectively, based on sensor measurements received from the perception system;
   autonomously controlling the robotic foodstuff assembly system to pick bulk ingredients from a target foodstuff bin, selected from the first and second foodstuff bins; and
   concurrently with controlling the robotic foodstuff assembly system:
      estimating a gross ingredient parameter for each of the first and second foodstuff bins based on the first and second ingredient models, respectively; and
      determining a pick parameter based on the uncalibrated weight of the target foodstuff bin; and
      at a human-machine interface (HMI) of the foodstuff assembly system, providing feedback based on the gross ingredient parameter for each of the first and second foodstuff bins and the pick parameter.

2. The method of claim 1, further comprising: based on the gross ingredient parameter of at least one foodstuff bin, determining satisfaction of a trigger condition associated with a remaining time until conveyor line stoppage; and, in response, automatically providing an alert via the HMI.

3. The method of claim 1, further comprising: based on the sensor measurements, automatically detecting a refill event at a first foodstuff bin and, in response, selecting second foodstuff bin as the target foodstuff bin during the refill event; and after the refill event, regenerating the first ingredient model.

4. The method of claim 3, wherein the refill event is associated with a manual slide transition of the first foodstuff bin from a pick region, within a workspace of the foodstuff assembly system, to a refill region, beyond the workspace of the foodstuff assembly system, the HMI comprising a display mounted above the refill region.

5. The method of claim 4, wherein, when arranged in a first configuration, the first foodstuff bin is supported by the first force sensor and laterally constrained within the pick region by a set of locating features proximal to a base of the foodstuff bin, wherein a lip of the foodstuff bin is accessible to a user in the first configuration.

6. The method of claim 1, wherein the feedback provided at the HMI comprises a dynamically estimated number of remaining picks within each foodstuff bin, wherein the number of remaining picks is based on a target pick amount.

7. The method of claim 1, wherein the feedback provided at the HMI comprises a dynamically estimated time remaining until the first foodstuff bin is empty, wherein the time remaining is dynamically estimated based on inferred contextual information associated with an adjacent conveyor line.

8. A method for a foodstuff assembly system, comprising:
   receiving sensor measurements from a sensor suite of the foodstuff assembly system, the sensor suite comprising:
      a set of perception sensors and a set of force sensors, wherein the sensor measurements comprise perception data from the set of perception sensors and uncalibrated weight measurements from the set of force sensors;

based on the sensor measurements, maintaining an ingredient model of bulk ingredients within a foodstuff bin;

determining a set of ingredient parameters, comprising:

volumetrically estimating a remaining amount of the bulk ingredients within the foodstuff bin based on the ingredient model; and based on the sensor measurements, determining an ingredient pick parameter based on a mass change associated with an ingredient pick; and providing feedback at a human-machine interface (HMI) of the foodstuff assembly system based on the set of ingredient parameters.

9. The method of claim 8, wherein providing feedback at the HMI comprises: in response to at least one ingredient parameter satisfying a trigger condition, automatically providing a user alert via the HMI.

10. The method of claim 9, wherein the remaining amount of bulk ingredients is estimated as: a percentage of reachable volume, a remaining number of picks, or a remaining time to refill.

11. The method of claim 8, wherein the HMI comprises a primary display opposite a conveyor region of the foodstuff assembly system and a secondary interface adjacent to the conveyor region, the secondary interface configured to provide feedback to users on an opposing side of a conveyor line.

12. The method of claim 8, further comprising, based on the sensor measurements, based on the perception data, determining a refill event associated with a user manually refilling the foodstuff bin with ingredients; and regenerating the ingredient model based on the refill event.

13. The method of claim 12, further comprising: contemporaneously with the user manually refilling the foodstuff bin, autonomously controlling the foodstuff assembly system to pick bulk foodstuff from a second foodstuff bin.

14. The method of claim 8, wherein the ingredient model comprises a surface estimate of the bulk ingredients which is estimated based on the perception data.

15. The method of claim 8, wherein the mass change is determined based on a reduction in weight of the bulk ingredients, measured by the set of force sensors, across a period of the ingredient pick.

16. The method of claim 8, wherein the foodstuff assembly system houses a plurality of foodstuff bins, each containing the bulk ingredients, the plurality of foodstuff bins comprising the foodstuff bin and an auxiliary foodstuff bin, wherein the set of ingredient parameters further comprises an amount of the bulk ingredients within the auxiliary foodstuff bin, wherein providing feedback at the HMI comprises simultaneously displaying:

the remaining amount of bulk ingredients within the foodstuff bin;

the amount of bulk ingredients within the auxiliary foodstuff bin; and the ingredient pick parameter.

17. The method of claim 8, wherein the feedback provided at the HMI comprises multi-modal feedback associated with the remaining amount of ingredients, the multi-modal feedback comprising: alpha-numeric feedback, iconographic feedback, and color-coded feedback.

18. The method of claim 8, wherein the remaining amount of bulk ingredients is volumetrically estimated based on the ingredient model and a remnant model.

19. The method of claim 18, wherein the remnant model is predetermined for a refill cycle, wherein, while the foodstuff assembly system remains in a machine configuration, the remnant model is dynamically refined based on at least one prior ingredient model, wherein the at least one prior ingredient model is associated with an unpickable control condition.

20. The method of claim 8, wherein the HMI is configured to display:

a graph of the ingredient pick parameter across a set of picks; and at least one central tendency metric of the ingredient pick parameter for the set of picks.

21. A method for a foodstuff assembly system, comprising:

receiving sensor measurements from a sensor suite of the foodstuff assembly system;

based on the sensor measurements, maintaining an ingredient model of bulk ingredients within a foodstuff bin;

determining a set of ingredient parameters, comprising:

volumetrically estimating a remaining amount of the bulk ingredients within the foodstuff bin based on:

the ingredient model; and a remnant model; and based on the sensor measurements, determining an ingredient pick parameter based on a mass change associated with an ingredient pick; and providing feedback at a human-machine interface (HMI) of the foodstuff assembly system based on the set of ingredient parameters.

22. The method of claim 21, wherein the remnant model is predetermined for a refill cycle, wherein, while the foodstuff assembly system remains in a machine configuration, the remnant model is dynamically refined based on at least one prior ingredient model, wherein the at least one prior ingredient model is associated with an unpickable control condition.

* * * * *